United States Patent
Ohta et al.

(10) Patent No.: US 9,738,023 B2
(45) Date of Patent: Aug. 22, 2017

(54) ADAPTIVE CONTROL DEVICE AND ADAPTIVE CONTROL METHOD, AND CONTROL DEVICE AND CONTROL METHOD FOR INJECTION MOLDING MACHINE

(75) Inventors: Hideaki Ohta, Kobe (JP); Hiroaki Fujimoto, Kobe (JP); Koichi Masaoka, Akashi (JP); Takehisa Katoh, Kobe (JP); Shuhei Ohtsuka, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 685 days.

(21) Appl. No.: 14/342,020

(22) PCT Filed: Jul. 24, 2012

(86) PCT No.: PCT/JP2012/004698
§ 371 (c)(1),
(2), (4) Date: Apr. 11, 2014

(87) PCT Pub. No.: WO2013/031082
PCT Pub. Date: Mar. 7, 2013

(65) Prior Publication Data
US 2014/0228980 A1 Aug. 14, 2014

(30) Foreign Application Priority Data
Aug. 30, 2011 (JP) ................................ 2011-186989

(51) Int. Cl.
*G05D 3/12* (2006.01)
*G05D 5/00* (2006.01)
(Continued)

(52) U.S. Cl.
CPC ............ *B29C 45/77* (2013.01); *G05B 13/021* (2013.01); *G05B 13/041* (2013.01)

(58) Field of Classification Search
None
See application file for complete search history.

(56) References Cited

U.S. PATENT DOCUMENTS 4,698,745 A * 10/1987 Hiroi ...................... G05B 13/04
700/37
5,625,561 A * 4/1997 Kato .................... G05B 19/401
700/193
(Continued)

FOREIGN PATENT DOCUMENTS

| JP | B2-3098020 | 10/2000 |
| JP | B2-3350923 | 11/2002 |
| JP | A-2010-253490 | 11/2010 |

OTHER PUBLICATIONS

International Search Report issued International Search Report issued in PCT/JP2012/004698 dated Aug. 21, 2012.
(Continued)

*Primary Examiner* — Diem Cao
(74) *Attorney, Agent, or Firm* — Oliff PLC

(57) ABSTRACT

An adaptive control device and adaptive control method, and a control device of an injection molding machine, which allow optimal adaptive control to be performed automatically and easily, while preventing a degradation of responsiveness. The adaptive control device is configured to perform feedback control in such a manner that an operation value is output based on a command value and a feedback value which is a sum of a controlled value output from a controlled target and a compensation value output from a parallel feed-forward compensator; wherein the parallel feed-forward compensator includes: an identification section which sequentially estimates a frequency response characteristic of the controlled target and an adjustment section which adjusts the compensation value based on the estimated frequency response characteristic.

22 Claims, 16 Drawing Sheets

(51) Int. Cl.
G05D 9/00 (2006.01)
G05D 11/00 (2006.01)
G05D 17/00 (2006.01)
B29C 45/77 (2006.01)
G05B 13/02 (2006.01)
G05B 13/04 (2006.01)

(56) References Cited

U.S. PATENT DOCUMENTS 5,959,861 A * 9/1999 Kaneko .................... G05B 5/01
700/159
2001/0042934 A1* 11/2001 Usui ....................... B29C 45/77
264/40.5
2009/0087510 A1 4/2009 Hakoda et al.
2011/0137514 A1* 6/2011 Itabashi ............... B60W 10/06
701/31.4

OTHER PUBLICATIONS

Aug. 30, 2016 Search Report issued in European Patent Application No. 12828986.5.
Yanada, Hideki et al. "Adaptive control of an electrohydraulic servo system utilizing online estimate of its natural frequency". Mechatronics. vol. 17. pp. 337-343, 2007.
Ljung, Lennart. "System Identification: Theory for the User". pp. 71-81, 1987.
Iwai, Z. et al. "Realization of simple adaptive control by using parallel feedforward compensator". International Journal of Control. vol. 59, No. 6, pp. 1543-1565, 1994.

* cited by examiner

ADAPTIVE CONTROL DEVICE AND ADAPTIVE CONTROL METHOD, AND CONTROL DEVICE AND CONTROL METHOD FOR INJECTION MOLDING MACHINE

TECHNICAL FIELD

The present invention relates to an adaptive control device and adaptive control method which use a parallel feed-forward compensator. Particularly, the present invention relates to a control device and control method for an injection molding machine to which the adaptive control method is applied.

BACKGROUND ART

As a control method for estimating parameters while stabilizing a control system, for a controlled target whose parameters are unknown, adaptive control is generally known. As a general adaptive control method, model reference adaptive control, self-tuning regulator, etc., are known. These adaptive control methods have a problem that since control algorithms are complicated and control parameters to be designed are numerous, it is difficult to adjust them.

As an adaptive control method for solving such a problem, there is known simple adaptive control (SAC) which assumes a model which realizes an ideal state and changes control parameters such that an actual output of a controlled target matches the model (see, e.g., Patent Literature 1). To enable the controlled target to be controlled by the SAC, it is required that ASPR (almost strictly positive real) condition be satisfied. To satisfy the ASPR, an output of a compensator called a parallel feed-forward compensator (PFC) is added to the output of the controlled target, which is known control.

However, in the above stated simple adaptive control which is somewhat simplified, there are still many parameters in design of the parallel feed-forward compensator, and therefore an expertise is needed. When consideration is given to a change in the controlled target and robustness of the control system, it is necessary to increase a compensation value output from the PFC to provide a design which gives importance to stability. However, this would degrade responsiveness. As a method of solving this problem, there is known a configuration in which gains of controlled target process are pre-stored, and modification values of PFC gains which are used in parallel feed-forward compensation computation are automatically adjusted based on the gains (see, e.g., Patent Literature 2), and a configuration in which model parameters of the controlled target are sequentially identified, and the PFC is sequentially adjusted according to a result of the identification (see, e.g., Patent Literature 3).

CITATION LIST

Patent Literature

Patent Literature 1: Patent No. 3098020
Patent Literature 2: Patent No. 3350923
Patent Literature 3: Japanese-Laid Open Patent Application Publication No. 2010-253490

SUMMARY OF INVENTION

Technical Problem

However, in the configuration disclosed in Patent Literature 2, in a case where the controlled target changes and the gains of the controlled target process change, it is necessary to newly set the gains and therefore automatic adjustment (on-line adjustment) cannot be performed in response to a change in the controlled target. Also, in the configuration disclosed in Patent Literature 3, the parameters of a particular model are identified and the control parameters are adjusted. Therefore, parameters of an unidentified or unknown controlled target cannot be sequentially identified, and the configuration disclosed in Patent Literature 3 is not versatile. In addition, since the identified model parameters are directly used as the control parameters, the control parameters may take unexpected values if an error associated with modeling is great. As a result, it is more likely that proper control is not implemented, and responsiveness degrades.

The present invention is developed to solve the above described problems, and an object is to provide an adaptive control device and adaptive control method, and a control device and control method for an injection molding machine, which allow optimal adaptive control to be performed automatically and easily while preventing a degradation of responsiveness.

Solution to Problem

According to an aspect of the present invention, there is provided an adaptive control device comprising: a controller which outputs an operation value to a controlled target; and a parallel feed-forward compensator which outputs based on the operation value, a compensation value used for compensating a feedback value of a controlled value output from the controlled target; the controller being configured to perform feedback control in such a manner that the controller outputs the operation value based on a command value and the feedback value which is a sum of the controlled value output from the controlled target and the compensation value output from the parallel feed-forward compensator; wherein the parallel feed-forward compensator includes: an identification section which sequentially estimates a frequency response characteristic of the controlled target; and an adjustment section which adjusts the compensation value based on the estimated frequency response characteristic.

In accordance with this configuration, the compensation value output from the parallel feed-forward compensator is automatically adjusted according to the frequency response characteristic of the controlled target which is sequentially identified. Therefore, it is not necessary to manually re-adjust the compensation value in response to a change in the controlled target. In addition, an unnecessary increase in the compensation value does not occur, which can prevent a degradation of responsiveness. Besides, since control parameters are adjusted based on the frequency response characteristic, a tolerance associated with modeling error is greater in the present configuration than in the conventional configuration which directly uses the identified parameters as the control parameters. In other words, the control parameters can be adjusted appropriately merely by detecting a trend of the frequency response characteristic even when the modeling error is greater. Therefore, in accordance with the above configuration, optimal adaptive control can be performed automatically and easily while preventing a degradation of responsiveness.

The identification section may sequentially identify a model of the controlled target, and estimate a transfer function of the controlled target, and the identification section may sequentially estimate the frequency response characteristic of the controlled target based on the estimated transfer function. This makes it possible to estimate the above frequency response characteristic by utilizing the known sequential identification method.

The identification section may use a linear black box model. In this configuration, the controlled target which can be identified is not limited to a particular model, and the adaptive control device is applicable to various controlled targets. Therefore, a versatile adaptive control device can be implemented.

The identification section may use a physical model of the controlled target. In this configuration, in a case where a physical structure of the controlled target is obvious, it becomes possible to construct an adaptive control device which provides a higher accuracy.

The identification section may estimate coefficients in polynomial representation of the linear black box model and unknown constants of the physical model, using a Kalman filter. In this configuration, the above adaptive control can be implemented by utilizing the known configuration.

The adjustment section may be configured to adjust the compensation value by multiplying by predetermined coefficients, a frequency and a gain in which a phase lag of the controlled target is equal to or greater than a predetermined value based on the frequency response characteristic. In this configuration, the compensation value output from the parallel feed-forward compensator can be adjusted appropriately for various controlled targets with a simple configuration.

The parallel feed-forward compensator may have a transfer function in a first order lag system.

The controller may include: a simple adaptive control unit which adjusts a plurality of adaptive gains such that the controlled value output from the controlled target tracks a reference model designed to provide a predetermined response; and the plurality of adaptive gains may include a first feed-forward gain corresponding to the command value, a second feed-forward gain corresponding to a state amount of the reference model, and a feedback gain corresponding to a deviation between an output of the reference model and the feedback value. In this configuration, in simple adaptive control, optimal adaptive control can be performed automatically and easily while preventing a degradation of responsiveness.

According to another aspect of the present invention, there is provided a control device of an injection molding machine which includes a pressure controller which outputs a pressure operation value to a motor for adjusting a pressure in a hydraulic cylinder of the injection molding machine; and a parallel feed-forward compensator which outputs, based on the pressure operation value, a pressure compensation value used for compensating a feedback value based on the pressure in the hydraulic cylinder, the pressure controller being configured to perform feedback control in such a manner that the pressure controller outputs the pressure operation value based on a command value and the feedback value which is a sum of the pressure in the hydraulic cylinder and the pressure compensation value output from the parallel feed-forward compensator; wherein the parallel feed-forward compensator includes: an identification section which sequentially estimates a frequency response characteristic of the injection molding machine; and an adjustment section which adjusts the pressure compensation value based on the estimated frequency response characteristic.

In accordance with the above configuration, the pressure compensation value output from the parallel feed-forward compensator is automatically adjusted according to the frequency response characteristic of the injection molding machine which is sequentially identified. Therefore, it is not necessary to manually re-adjust the pressure compensation value in response to a change in a size of the hydraulic cylinder used in the injection molding machine, an injection material (material to be injected), etc. In addition, an unnecessary increase in the pressure compensation value does not occur, which can prevent a degradation of responsiveness. Besides, since the control parameters are adjusted based on the frequency response characteristic, a tolerance associated with modeling error is greater in the present configuration than in the conventional configuration which directly uses the identified parameters as the control parameters. In other words, the control parameters can be adjusted appropriately merely by detecting a trend of the frequency response characteristic even when the modeling error is greater. Therefore, in accordance with the above configuration, optimal adaptive control can be performed automatically and easily while preventing a degradation of responsiveness.

The adjustment section may be configured to select either one of the frequency response characteristic of the injection molding machine which is sequentially estimated by the identification section, and a predetermined frequency response characteristic of the injection molding machine or the frequency response characteristic of the injection molding machine which is estimated at past time by the identification section, and adjust the pressure compensation value based on the selected frequency response characteristic. In accordance with this configuration, in a case where it is difficult to correctly estimate the frequency response characteristic by the sequential identification, for example, at a time point just after the pressure controller has started the control of the injection molding machine, the pressure compensation value is adjusted using the predetermined frequency response characteristic or the frequency response characteristic estimated at past time by the identification section, thereby preventing a situation in which the adaptive control becomes unstable, while in other cases, the injection molding machine is controlled using the frequency response characteristic sequentially identified. In this way, optimal adaptive control can be performed while preventing a degradation of responsiveness.

The control device may comprise a flow controller for controlling a flow of hydraulic oil inflowing to the hydraulic cylinder; wherein the control device may be configured to detect, after starting flow control using the flow controller, at least one of the pressure in the hydraulic cylinder, a stroke of a piston sliding within the hydraulic cylinder, and time that passes from when the flow control using the flow controller has started, and to start pressure control using the pressure controller, in place of the flow controller, when the detected value exceeds a corresponding preset predetermined threshold. In this configuration, it becomes possible to switch between the flow control and the pressure control according to the state of the injection molding machine. Therefore, proper control can be implemented.

According to another aspect of the present invention, there is provided an adaptive control method using a control system constructed by adding a parallel feed-forward compensator to a controlled target, comprising the steps of: outputting an operation value to the controlled target; outputting based on the operation value, a compensation value used for compensating a feedback value of a controlled value output from the controlled target; and performing feedback control in such a manner that the operation value is output based on a command value and the feedback value which is a sum of the controlled value output from the controlled target and the compensation value: wherein the step of outputting the compensation value includes the steps of: sequentially estimating a frequency response characteristic of the controlled target; and adjusting the compensation value based on the estimated frequency response characteristic.

In accordance with this method, the compensation value output from the parallel feed-forward compensator is automatically adjusted according to the frequency response characteristic of the controlled target which is sequentially identified. Therefore, it is not necessary to manually re-adjust the compensation value in response to a change in the controlled target. In addition, an unnecessary increase in the compensation value does not occur, which can prevent a degradation of responsiveness. Besides, since control parameters are adjusted based on the frequency response characteristic, a tolerance associated with modeling error is greater in the present method than in the conventional method which directly uses the identified parameters as the control parameters. In other words, the control parameters can be adjusted appropriately merely by detecting a trend of the frequency response characteristic even when the modeling error is greater. Therefore, in accordance with the above method, optimal adaptive control can be performed automatically and easily while preventing a degradation of responsiveness.

In the step of sequentially estimating the frequency response characteristic, a model of the controlled target may be sequentially identified, and a transfer function of the controlled target may be estimated, and the frequency response characteristic of the controlled target may be sequentially estimated based on the estimated transfer function. This makes it possible to estimate the frequency response characteristic by utilizing the known sequential identification method.

In the step of sequentially estimating the frequency response characteristic, a linear black box model may be used. In this method, the controlled target which can be identified is not limited to a particular model, and the adaptive control method is applicable to various controlled targets. Therefore, a versatile adaptive control method can be implemented.

In the step of sequentially estimating the frequency response characteristic, a physical model of the controlled target may be used. In this method, in a case where the physical structure of the controlled target is obvious, the adaptive control method can be made more accurate.

In the step of sequentially estimating the frequency response characteristic, coefficients in polynomial representation of the linear black box model and unknown constants of the physical model may be estimated, using a Kalman filter. In this method, the adaptive control can be implemented easily by utilizing the known method.

In the step of adjusting the compensation value, the compensation value may be adjusted by multiplying by predetermined coefficients, a frequency and a gain in which a phase lag of the controlled target is equal to or greater than a predetermined value, based on the frequency response characteristic. In this method, the compensation value output from the parallel feed-forward compensator can be adjusted appropriately for various controlled targets with a simple configuration.

The parallel feed-forward compensator may have a transfer function in a first order lag system.

The step of outputting the operation value may include the step of adjusting a plurality of adaptive gains such that the controlled value output from the controlled target tracks a reference model designed to provide a predetermined response; and the plurality of adaptive gains include a first feed-forward gain corresponding to the command value, a second feed-forward gain corresponding to a state amount of the reference model, and a feedback gain corresponding to a deviation between an output of the reference model and the feedback value. In this method, in the simple adaptive control, optimal adaptive control can be performed automatically and easily while preventing a degradation of responsiveness.

According to another aspect of the present invention, there is provided a method of controlling an injection molding machine which uses a control system constructed by adding a parallel feed-forward compensator to a pressure in a hydraulic cylinder of the injection molding machine, the method comprising the steps of: outputting a pressure operation value to a motor for adjusting the pressure in the hydraulic cylinder of the injection molding machine; outputting based on the pressure operation value, a pressure compensation value used for compensating a feedback value based on the pressure in the hydraulic cylinder; and performing feedback control in such a manner that the pressure operation value is output based on a command value and the feedback value which is a sum of the pressure in the hydraulic cylinder and the pressure compensation value; wherein the step of outputting the compensation value includes the steps of: sequentially estimating a frequency response characteristic of the injection molding machine; and adjusting the pressure compensation value based on the estimated frequency response characteristic.

In accordance with this method, the pressure compensation value output from the parallel feed-forward compensator is automatically adjusted according to the frequency response characteristic of the injection molding machine which is sequentially identified. Therefore, it is not necessary to manually re-adjust the pressure compensation value in response to a change in a size of the hydraulic cylinder used in the injection molding machine, an injection material (material to be injected), etc. In addition, an unnecessary increase in the pressure compensation value does not occur, which can prevent a degradation of responsiveness. Besides, since control parameters are adjusted based on the frequency response characteristic, a tolerance associated with modeling error is greater in the present configuration than in the conventional configuration which directly uses the identified parameters as the control parameters. In other words, the control parameters can be adjusted appropriately merely by detecting a trend of the frequency response characteristic even when the modeling error is greater. Therefore, in accordance with the above method, optimal adaptive control can be performed automatically and easily while preventing a degradation of responsiveness.

In the step of adjusting the pressure compensation value, either one of the frequency response characteristic of the injection molding machine which is sequentially estimated in the step of sequentially estimating the frequency response characteristic, and a predetermined frequency response characteristic of the injection molding machine or the frequency response characteristic of the injection molding machine which is estimated at past time in the step of sequentially estimating the frequency response characteristic, may be selected, and the pressure compensation value may be adjusted based on the selected frequency response characteristic. In accordance with this method, in a case where it is difficult to correctly estimate the frequency response characteristic by the sequential identification, for example, at a time point just after the pressure control has started, the pressure compensation value is adjusted using the predetermined frequency response characteristic or the frequency response characteristic estimated at past time in the step of sequentially estimating the frequency response characteristic, thereby preventing a situation in which the adaptive control becomes unstable, while in other cases, the injection molding machine is controlled using the frequency response characteristic identified sequentially. In this way, optimal adaptive control can be performed while preventing a degradation of responsiveness.

The method of controlling the injection molding machine may comprise the step of: controlling a flow of hydraulic oil inflowing to the hydraulic cylinder; wherein a pressure control step including the step of outputting the operation value, the step of outputting the compensation value, and the step of performing the feedback control, may be started in place of the step of controlling the flow of the hydraulic oil, when at least one of the pressure in the hydraulic cylinder, a stroke of a piston sliding within the hydraulic cylinder, and time that passes from when the step of controlling the flow of the hydraulic oil has started, exceeds a corresponding preset predetermined threshold, after the step of controlling the flow of the hydraulic oil has started. In this method, it becomes possible to switch between the flow control and the pressure control according to the state of the injection molding machine. Therefore, proper control can be implemented.

The above and further objects, features and advantages of the invention will more fully be apparent from the following detailed description with accompanying drawings.

Advantageous Effects of Invention

The present invention has been configured as described above, and has advantages that optimal adaptive control can be performed automatically and easily while preventing a degradation of responsiveness.

DESCRIPTION OF EMBODIMENTS

Hereinafter, an embodiment of the present invention will be described with reference to the drawings. Throughout the drawings, the same or corresponding components are designated by the same reference symbols and will not be described in repetition.

[Overall Configuration]

Figure 1:
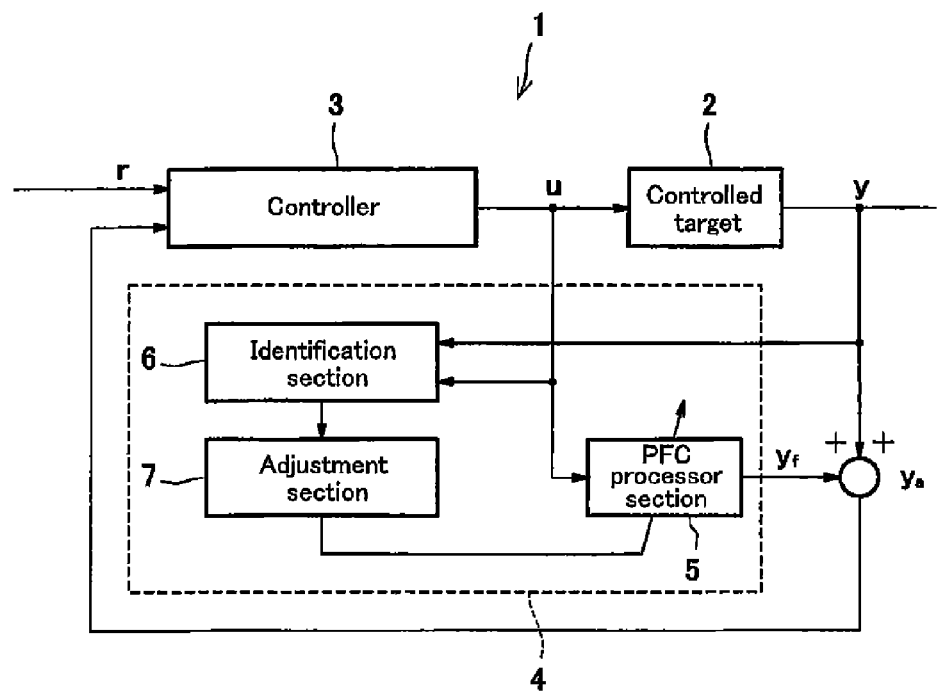
FIG. 1 is a block diagram showing an exemplary schematic configuration of an adaptive control device according to an embodiment of the present invention.

FIG. 1 is a block diagram showing an exemplary schematic configuration of an adaptive control device according to an embodiment of the present invention. As shown in FIG. 1, an adaptive control device 1 of the present embodiment includes a controller 3 which outputs an operation value u to a controlled target 2, and a parallel feed-forward compensator (hereinafter will also be simply referred to as PFC) 4 which outputs based on the operation value u, a compensation value $y_f$ used for compensating a feedback value $y_a$ of a controlled value y output from the controlled target 2. The controller 3 is configured to perform feedback control in such a manner that it outputs the operation value u based on a command value r and the feedback value $y_a$ which is a sum of the controlled value y output from the controlled target 2 and the compensation value $y_f$ output from the PFC 4. The controller 3 and the PFC 4 may be configured by, for example, programming in such a manner that a computer such as a microcontroller provided inside or outside of the controlled target 2 performs predetermined digital computation, an analog or digital circuit, or a combination of these.

The PFC 4 includes a PFC processor section 5 which computes the compensation value $y_f$ based on the operation value u output from the controller 3, an identification section 6 which sequentially identifies a model of the controlled target 2 and estimates a transfer function of the controlled target 2, and an adjustment section 7 which estimates a frequency response characteristic of the controlled target 2 based on the transfer function identified by the identification section 6 and adjusts the compensation value $y_f$ output from the PFC processor section 5 based on the estimated frequency response characteristic of the controlled target 2.

Figure 2:
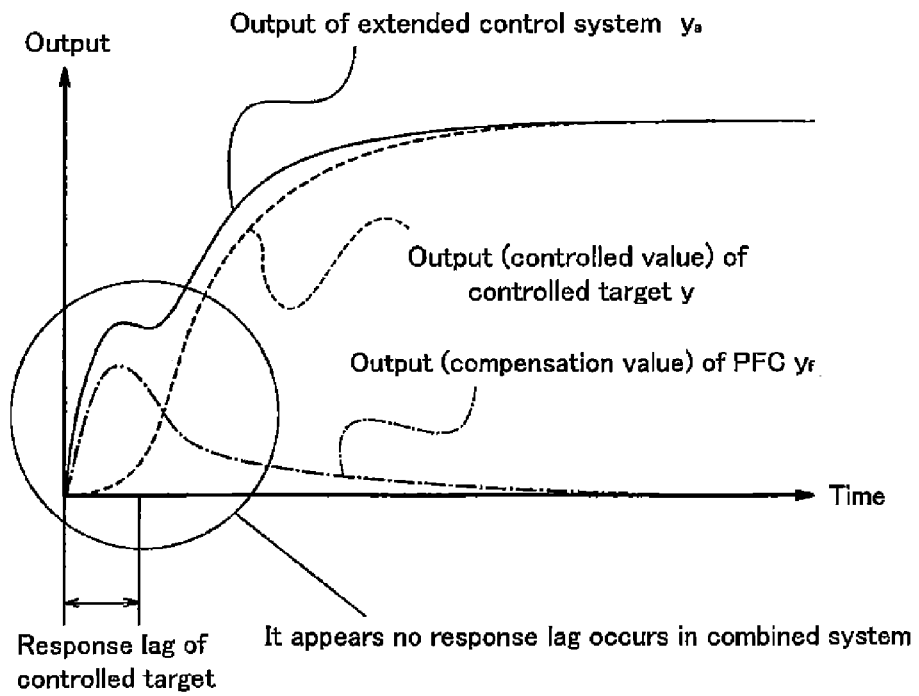
FIG. 2 is a graph of an open-loop response including a PFC, for explaining advantages of the PFC in a control device using a general PFC, which are shown in FIG. 8.
Figure 18:
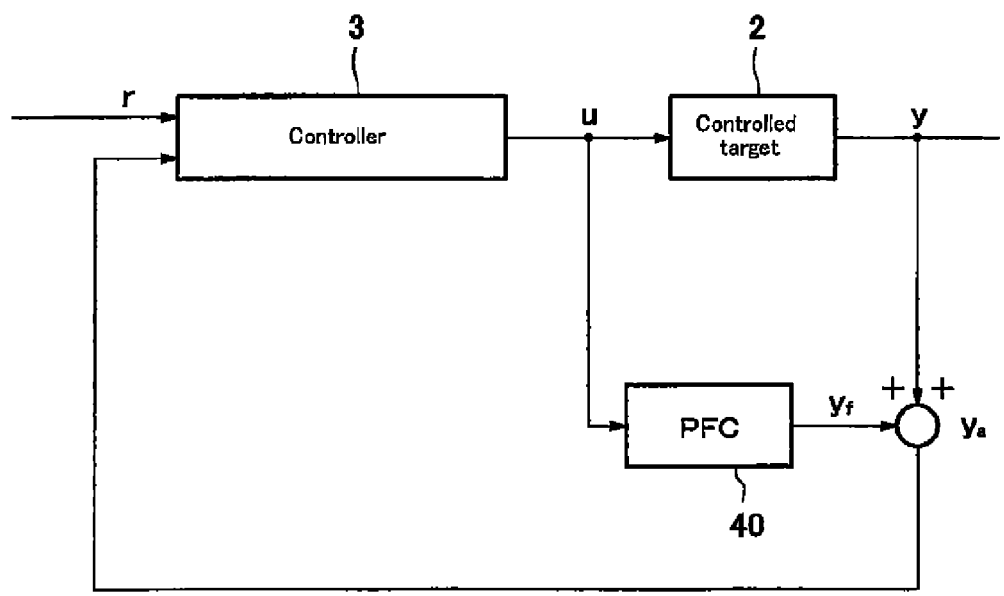
FIG. 18 is a block diagram showing an exemplary schematic configuration of a control device using a general PFC.

FIG. 2 is a graph of an open-loop response including a PFC, for explaining advantages of the PFC in a control device including a general PFC which are shown in FIG. 18. As shown in FIG. 18, it is assumed that a PFC 40 does not include the identification section 6 and the adjustment section 7. As shown in FIG. 2, typically, the controlled value y output from the controlled target 2 responds with a lag (delay) to the operation value u of the controller 3. With respect to this, the PFC 40 generates a pseudo output (compensation value $y_f$) used for compensating the response lag of the controlled target 2. This allows the output (feedback value $y_a$) of the control system (extended control system) which is a combination of the controlled target 2 and the PFC 40 to respond without a lag. The response lag is a major cause of unstability in the feedback control. The compensation for the response lag which is performed by the PFC 40 has advantages that basic stability is ensured and the controller 3 is designed very simply. A specific example of the PFC 40, there is a PFC which has a transfer function $G_f(s)$ in a first order lag system which is illustrated as follows:

$$G_f(s) = \frac{K_f \omega_f}{s + \omega_f} \quad (1)$$

To eliminate an offset resulting from addition of the compensation value $y_f$ of the PFC to the control valve y, the PFC 40 is sometimes caused to have a low-frequency cutoff characteristic as follows:

$$G_f(s) = \frac{s}{s + \omega_c} \frac{K_f \omega_f}{s + \omega_f} \quad (2)$$

When the compensation value $y_f$ output from the PFC 40 is greater, the control system tends to be stabilized more easily. However, if the compensation value $y_f$ is set greater in excess, then the output of the extended control system is deviated from the controlled value y output from the controlled target 2. As a result, responsiveness degrades.

In contrast, in accordance with the above described configuration, the compensation value $y_f$ output from the PFC 4 is automatically adjusted according to the frequency response characteristic of the controlled target 2 which is identified sequentially. Therefore, an unnecessary increase in the compensation value $y_f$ does not occur, and a degradation of the responsiveness can be prevented. Furthermore, differently from the conventional automatic adjustment method of the PFC, it is not necessary to manually re-adjust the compensation value $y_f$ in response to a change in the controlled target 2. In addition, the control parameters are adjusted based on the frequency response characteristic. Therefore, a tolerance associated with modeling error is greater in the present configuration than in the conventional configuration which directly uses the identified parameters as the control parameters. In other words, the control parameters can be adjusted appropriately merely by detecting a trend of the frequency response characteristic even when the modeling error is greater. Therefore, in accordance with the above configuration, optimal adaptive control can be performed automatically and easily while preventing a degradation of responsiveness.

<Adjustment Method of PFC>

Figure 3:
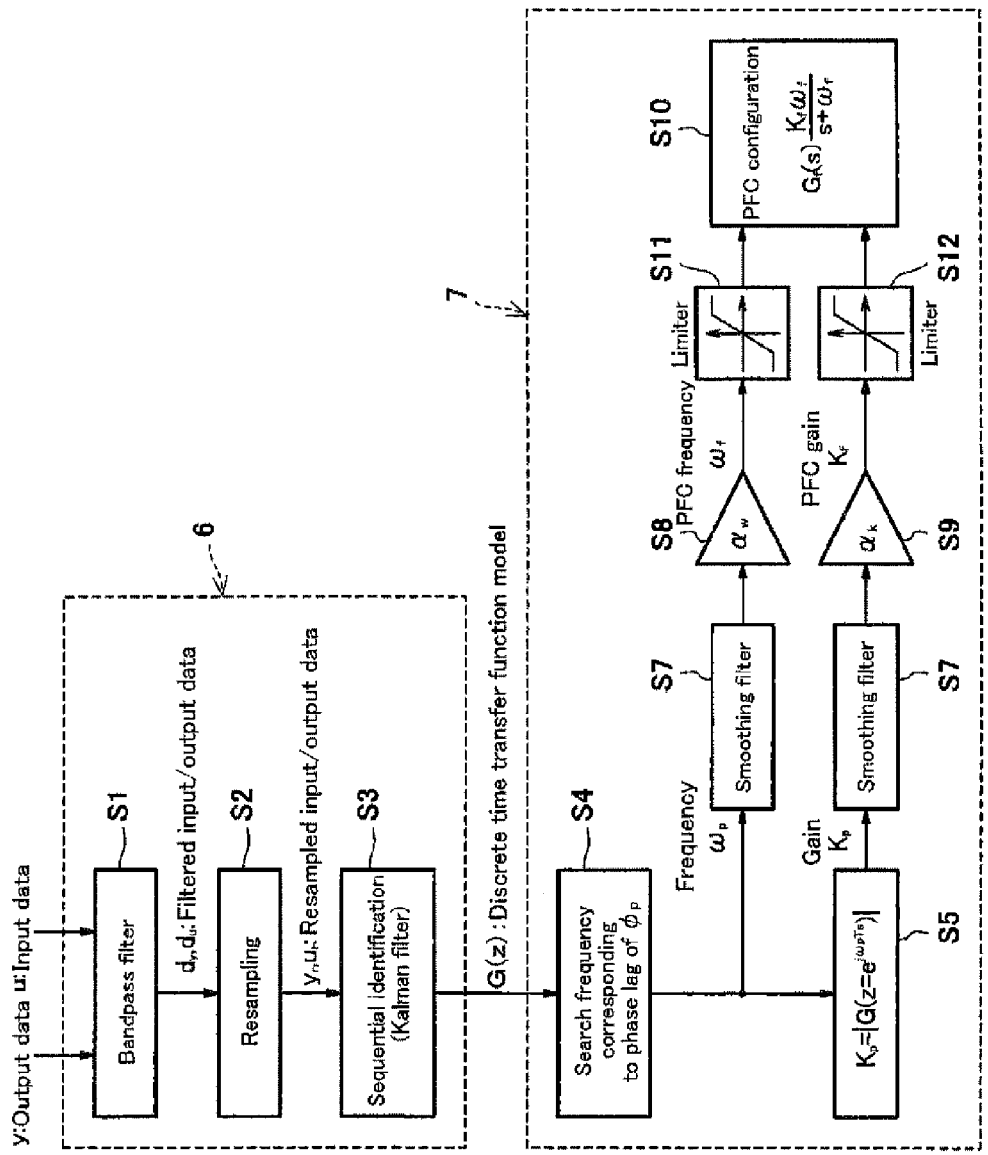
FIG. 3 is a flowchart showing a flow of adjustment of PFC in the adaptive control device of FIG. 1.

Hereinafter, the adjustment method of the compensation value in the PFC 4 will be described. FIG. 3 is a flowchart showing a flow of adjustment of the PFC in the adaptive control device of FIG. 1. As shown in FIG. 3, the identification section 6 of the PFC4 receives as inputs the operation value u which is data input to the controlled target 2 and the controlled value y which is data output from the controlled target 2. A bandpass filter (not shown, including a highpass filter and a lowpass filter) removes from the input operation value u and the input controlled value y, a component such as a noise component, which is other than a predetermined frequency range (step S1). Resampling is performed for a filtered operation value $d_u$ and a filtered controlled value $d_y$ (step S2).

Then, the identification section 6 sequentially performs identification using the resampled values (step S3: identification step). In the present embodiment, the identification section 6 estimates the frequency response characteristic of the controlled target 2 by sequentially identifying the model of the controlled target 2 and finding the transfer function of the controlled target 2. At this time, the identification section 6 performs identification by using a linear black box model (especially, model called ARX model). This makes it possible to estimate the frequency response characteristic by utilizing a known sequential identification method. In addition, the controlled target 2 which can be identified is not limited to a particular model, and the adaptive control device is applicable to various controlled targets 2. Therefore, a versatile adaptive control device can be implemented. Specifically, the model of the controlled target 2 is described as follows:

$$A(z^{-1}) y_r(k) = z^{-km} B(z^{-1}) u_r(k) + v(k) \quad (3)$$

$u_r(k)$ indicates an operation value (input data) at time k after the re-sampling, $y_r(k)$ indicates a controlled value (output data) at time k after the re-sampling, $v(k)$ indicates disturbance term, km indicates dead time, and z indicates a time shift operator corresponding to one sample, and $z[x(k)] = x(k+1)$ is satisfied.

$A(z^{-1})$ and $B(z^{-1})$ are expressed as follows.

$$A(z^{-1}) = 1 + a_1 z^{-1} + a_2 z^{-2} + \ldots + a_{na} z^{-na}$$

$$B(z^{-1}) = b_1 z^{-1} + b_2 z^{-2} + \ldots + b_{nb} z^{-nb} \quad (4)$$

$a_1, a_2, \ldots, a_{na}$ indicate denominator parameters to be estimated, $b_1, b_2, \ldots, b_{nb}$ indicate numerator parameters to be estimated, na indicates the number of parameters of the denometer of the identified model, and nb indicates the number of parameters of the numerator of the identified model.

In this case, a predicted value $y_p(k)$ which is one stage after output data $y_r(k)$ at time k based on input/output data at time k−1 and its previous time can be expressed as follows:

$$y_p(k) = \phi^T(k) \theta$$

$$\theta = [a_1 \ldots a_{na} \, b_1 \ldots b_{nb}]^T$$

$$\phi(k) = [-y_r(k-1) \ldots -y_r(k-na) \, u_r(k-km-1) \ldots u_r(k-km-nb)]^T \quad (5)$$

θ indicates a parameter vector and φ(k) indicates a data vector at time k.

In this case, when it is assumed that a probabilistic change in the parameter vector θ indicates a change in the controlled target 2, the following equation is provided:

$$\theta(k+1) = \theta(k) + w(k)$$
$$y_r(k) = \varphi^T(k)\theta(k) + v(k)$$
$$E\left\{\begin{bmatrix} w(k) \\ v(k) \end{bmatrix} \begin{bmatrix} w^T(k) & v^T(k) \end{bmatrix}\right\} = \begin{bmatrix} Q & 0 \\ 0 & R \end{bmatrix}$$
(6)

Q indicates a variance (changing magnitude) of the parameters, and R indicates a variance of observation noise. Note that the variance Q of the parameters is 0 in a steady state (state in which no change occurs in input/output). The variance Q of the parameters and the variance R of observation noise are design parameters of the PFC 4.

In the present embodiment, the identification section 6 estimates the parameters (coefficients in polynomial representation) of the linear black box model, by using a Kalman filter. In other words, the identification section 6 estimates the parameter vector θ by using the Kalman filter based on the above equation (6).

Hereinafter, an estimation procedure using the Kalman filter will be described specifically. Firstly, the identification section 6 calculates a predicted error $\epsilon_i(k)$ and a Kalman gain W(k) as follows, using an initial value $\theta_i(k)$ of the estimated parameter value and an initial value $P_i(k)$ of error covariance matrix:

$$\varepsilon_i(k) = y_r(k) - y_{ip}(k) = y_r(k) - \varphi^T(k)\theta_i(k) \quad (7)$$

$$W(k) = \frac{P_i(k)\varphi(k)}{\varphi^T(k)P_i(k)\varphi(k) + R} \quad (8)$$

Based on the above equation (7) and the above equation (8), the identification section 6 modifies the estimated parameter value θ(k) and the error covariance matrix P(k) as follows:

$$\theta(k) = \theta_i(k) + W(k)\epsilon_i(k) \quad (9)$$

$$P(k) = P_i(k) - W(k)\phi^T(k)P_i(k) \quad (10)$$

Furthermore, time step is updated, and an initial value $\theta_i(k+1)$ of the estimated parameter value and an initial value $P_i(k+1)$ of the error covariance matrix in next step are calculated:

$$\theta_i(k+1) = \theta(k) \quad (11)$$

$$P_i(k+1) = P(k) + Q \quad (12)$$

Since the variance Q of the parameters=0 in the steady state, the initial value $P_i(k+1)$ of the error covariance matrix in next step is only P(k).

In the above described manner, the parameter vector θ is sequentially estimated.

A transfer function G(z) of the controlled target 2 is expressed as follows:

$$G(z) = \frac{B(z^{-1})}{A(z^{-1})}z^{-km} = \frac{b_1 z^{-1} + b_2 z^{-2} + \ldots + b_{nb} z^{-nb}}{1 + a_1 z^{-1} + a_2 z^{-2} + \ldots + a_{na} z^{-na}}z^{-km} \quad (13)$$

The above equation (13) can be expressed by the parameter vector θ estimated by the identification section 6. As described above, by applying the Kalman filter to the linear black box model, the frequency response characteristic of the controlled target 2 can be estimated by utilizing the known configuration.

Next, the adjustment section 7 designs the PFC based on the estimated transfer function G(z) of the controlled target 2. In the present embodiment, the PFC is a first order lag system expressed as the equation (1). The adjustment section 7 designs a break (corner) frequency $\omega_f$ (hereinafter will also be simply referred to as PFC frequency $\omega_f$) and a gain $K_f$ (hereinafter will also be simply referred to as PFC gain $K_f$) of the PFC in the first order lag system by multiplying by predetermined coefficients, a frequency and a gain in which a phase lag of the controlled target 2 is equal to or greater than a predetermined value. Specifically, firstly, the adjustment section 7 calculates by numerical search a frequency $\omega_p$ in which the phase lag of the controlled target 2 is equal to or greater than $\phi_p$, using the identified transfer function G(z) of the controlled target 2 (step S4). In addition, the adjustment section 7 calculates a gain $K_p = |G(z = \exp(j\omega_p T_s))|$ corresponding to the frequency $\omega_p$ (step S5). $T_s$ indicates a control cycle.

The adjustment section 7 applies a smoothing filter to the found frequency $\omega_p$ and the found gain $K_p$ (step S6, step S7). The smoothing filter is not particularly limited, and may be, for example, a moving average filter. In the case of using the moving average filter, a filtered frequency $\omega_{pf}$ and a filtered gain $K_{pf}$ are found as follows:

$$\omega_{pf}(k) = \omega_{pf}(k-1) + \frac{\omega_p(k) - \omega_p(k-ns)}{ns} \quad (14)$$

$$K_{pf}(k) = K_{pf}(k-1) + \frac{K_p(k) - K_p(k-ns)}{ns}$$

ns indicates the number of data used for the moving average.

By using the filtered frequency $\omega_{pf}$ and the filtered gain $K_{pf}$, which are found as described above, the adjustment section 7 multiplies the frequency $\omega_p$ and the gain $K_p$ in which the phase lag of the controlled target 2 is equal to or greater than the predetermined value $\phi_p$, by predetermined coefficients (frequency coefficient $\alpha_w$ and gain coefficient $\alpha_k$), respectively, using the identified transfer function G(z) of the controlled target 2, thereby designing the PFC frequency $\omega_f$ and the PFC gain $K_f$ of the transfer function $G_f(z)$ of the PFC 4 as follows (step S8, step S9):

$$\omega_f(k) = \alpha_w \omega_{pf}(k)$$

$$K_f(k) = \alpha_k K_{pf}(k) \quad (15)$$

The frequency coefficient $\alpha_w$ and the gain coefficient $\alpha_k$ are design parameters.

By using the PFC frequency $\omega_f$ and the PFC gain $K_f$ which are found as described above, the transfer function $G_f(s)$ of the PFC 4 (PFC processor section 5) is found (step S10: adjustment step). Based on the found transfer function $G_f(s)$ of the PFC 4, the compensation value $y_f$ is adjusted. In the present embodiment, the adjustment section 7 determines whether or not the value of the PFC frequency $\omega_f$ and the value of the PFC gain $K_f$ which are found in step S8 and step S9, respectively, exceed predetermined upper limit values, respectively, and uses limiters so that the upper limit values are not exceeded, if the value of the PFC frequency $\omega_f$ and the value of the PFC gain $K_f$ exceed the predetermined upper limit values, respectively (step S11, step S12). This makes it possible to effectively prevent a situation in which the transfer function $G_f(s)$ of the PFC 4 after the adjustment falls outside an adjustment range.

In a case where the PFC processor section 5 computes the transfer function $G_f(s)$ of the PFC 4, used is a discrete time transfer function $G_f(z)$ obtained by bilinear transformation of the continuous time transfer function $G_f(s)$ as follows:

$$G_f^d(z) = \frac{b_f}{z - a_f} \quad (16)$$

$$G_f(z) = G_f^d(z) + d_f$$

$$a_f = \frac{2 - \omega_f T_s}{2 + \omega_f T_s} \quad (17)$$

$$b_f = \frac{4K_f \omega_f T_s}{(2 + \omega_f T_s)^2}$$

$$d_f = \frac{K_f \omega_f T_s}{2 + \omega_f T_s}$$

$d_f$ indicates feedthrough term of the discrete time transfer function $G_f(z)$ of the PFC 4. That is, the discrete time transfer function $G^d_f(z)$ means the transfer function of the PFC 4 obtained by excluding the feedthrough term. In this case, the compensation value $y_f$ is calculated as follows:

$$y_f^d(k+1) = a_f y_f^d(k) + b_f \mu(k)$$

$$y_f(k) = y_f^d(k) + d_f \mu(k) \quad (18)$$

$y^d_f(k)$ means a compensation value obtained by excluding the feedthrough term. The equation (18) is in some cases expressed as follows:

$$y_f(k) = G_f(z)u(k) = G^d_f(z)u(k) + d_f \mu(k) = y_f^d(k) + d_f \mu(k) \quad (19)$$

By adjusting the compensation value $y_f$ as described above, the compensation value $y_f$ output from the PFC 4 can be adjusted appropriately for various controlled targets 2 with a simple configuration.

<SAC Unit>

Figure 4:
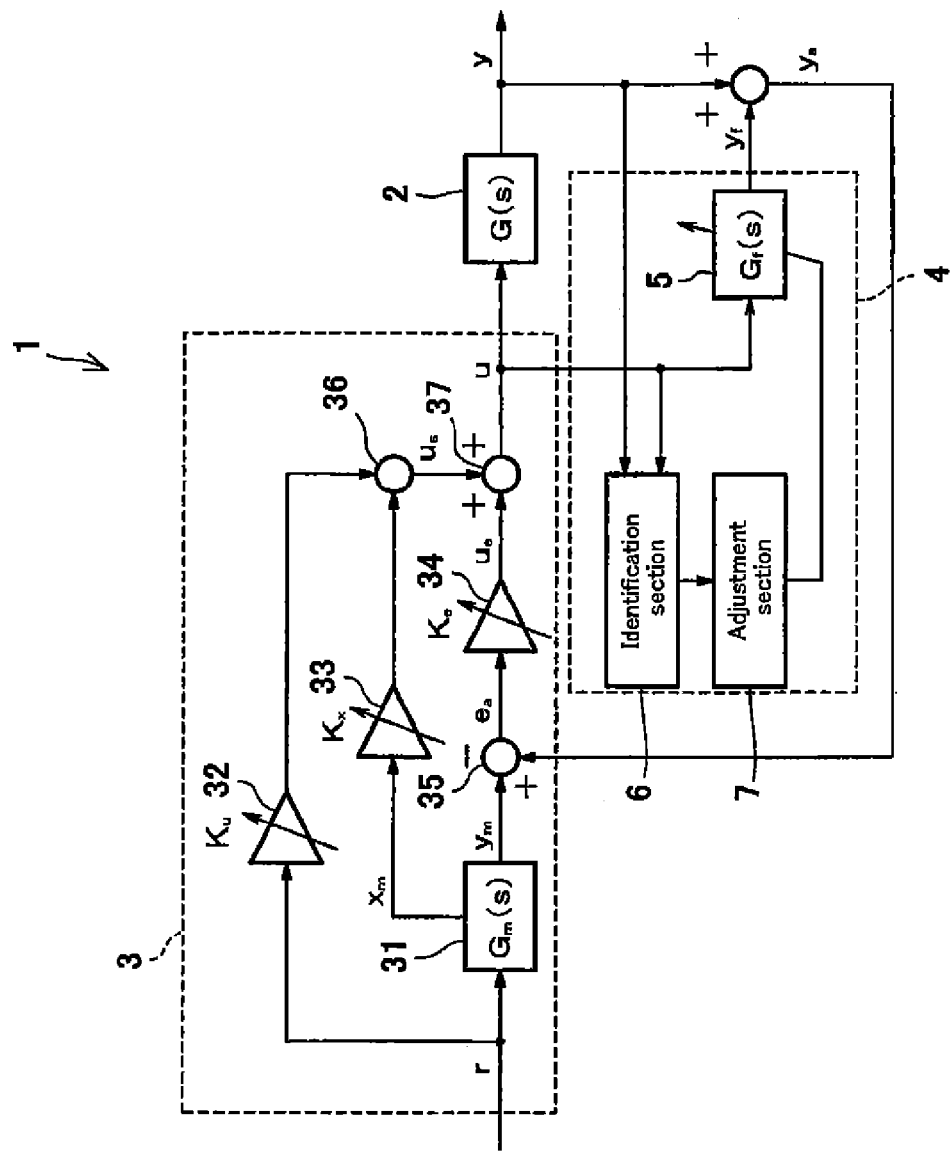
FIG. 4 is a block diagram showing an exemplary schematic configuration in a case where simple adaptive control is used in a controller of the adaptive control device of FIG. 1.

Next, the controller 3 of the present embodiment will be described. FIG. 4 is a block diagram showing an exemplary schematic configuration in a case where simple adaptive control is used in the controller of the adaptive control device of FIG. 1. As shown in FIG. 4, the controller 3 includes a simple adaptive control (SAC) section in which a plurality of adaptive gains are adjusted so that the controlled value y output from the controlled target 2 tracks (follows-up) a reference model designed to provide a predetermined (ideal) response. The plurality of adaptive gains include a first feed-forward gain $K_u$ corresponding to the command value r, a second feed-forward gain $K_x$ corresponding to a state amount $x_m$ of the reference model, and a feedback gain $K_e$ corresponding to a deviation between an output (reference output) $y_m$ of the reference model and the feedback value $y_a$. Specifically, the SAC unit includes a reference model application section 31 which applies the reference model to the input command value r and outputs the reference output $y_m$ which should be tracked by the output of the controlled target 2, a first multiplier 32 which multiplies the command value r by the first adaptive gain (first feed-forward gain) $K_u$, a second multiplier 33 which multiplies the state amount $x_m$ of the reference model (as will be described later) by the second adaptive gain (second feed-forward gain) $K_x$, a first subtracter 35 which calculates an error between the reference output $y_m$ and the output (feedback value) $y_a$ of the extended control system which is a sum of the controlled value y and the compensation value $y_f$ output from the PFC 4, a third multiplier 34 which multiplies an output $e_a$ of the first subtracter 35 by a third adaptive gain (feedback gain) $K_e$, a first adder 36 which adds an output of the first multiplier 32 and an output of the second multiplier 33, and a second adder 37 which adds an output $u_s$ of the first adder 36 and an output $u_e$ of the third multiplier 34 and outputs the operation value u.

The reference model is expressed as a discrete time state equation as follows to enable the computation performed by the computer:

$$x_m(k+1) = A_m x_m(k) + b_m r(k)$$

$$y_m(k) = c_m x_m(k) + d_m r(k) \quad (20)$$

$A_m$, $b_m$, $c_m$, and $d_m$ indicate parameters of the reference model.

In general, to enable the SAC unit to operate properly, it is required that the controlled target 2 satisfy almost strictly positive real (ASPR) condition. However, in general, a response lag such as dead time occurs in the controlled target 2, and therefore, in many cases, the controlled target 2 does not satisfy the ASPR condition. Therefore, in the present embodiment, as described above, the extended control system is constructed by adding the output of the PFC 4 to the output of the controlled target 2 so that the extended control system satisfies the ASPR condition. Under this state, the SAC unit is applied to the extended control system.

Figure 5:
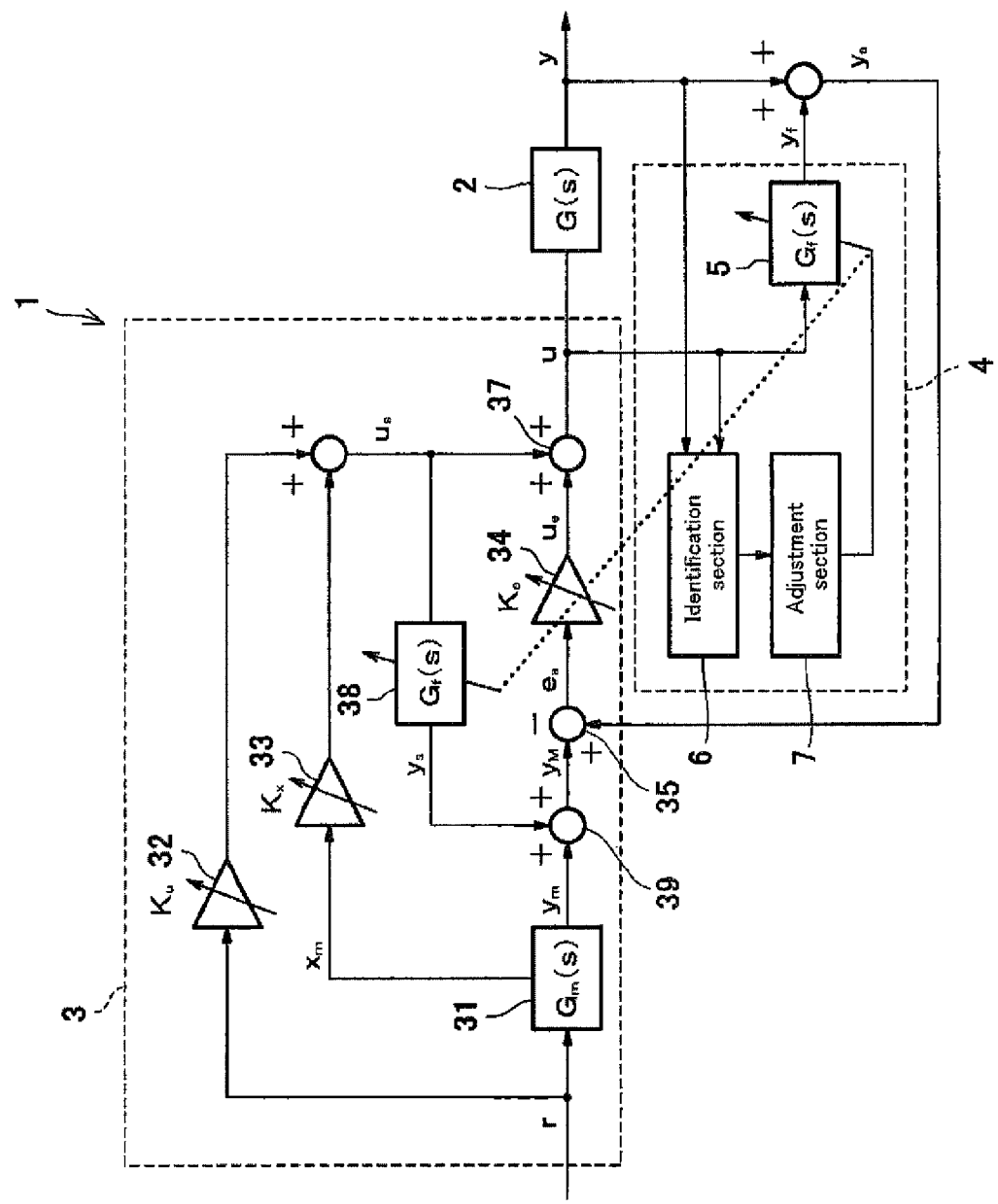
FIG. 5 is a block diagram showing an exemplary schematic configuration in a case where dynamic compensation is added to the adaptive control device of FIG. 4.

In this case, the output which tracks the reference model is not the output of the controlled target 2 which should track the reference model as an intended purpose, but the output of the extended control system. In other words, a steady-state deviation remains in the output of the controlled target 2. To eliminate the steady-state deviation, dynamic compensation is performed in such a manner that the PFC 4 having the same configuration is added to the output $y_m$ of the reference model application section 31. FIG. 5 is a block diagram showing an exemplary schematic configuration in a case where the dynamic compensation is added to the adaptive control device of FIG. 4. In the example of FIG. 5, in addition to the above described constituents, the SAC unit includes a dynamic compensator 38 which receives as an input the output $U_s$ of the first adder 36 and performs PFC computation as in the PFC processor section 5, and a third adder 39 which adds an output $y_s$ of the dynamic compensator 38 and the output $y_m$ of the reference model application section 31. The first subtracter 35 calculates an error between an output $y_M$ of the third adder 39 and the output (feedback value) $y_a$ of the extended control system.

Figure 6:
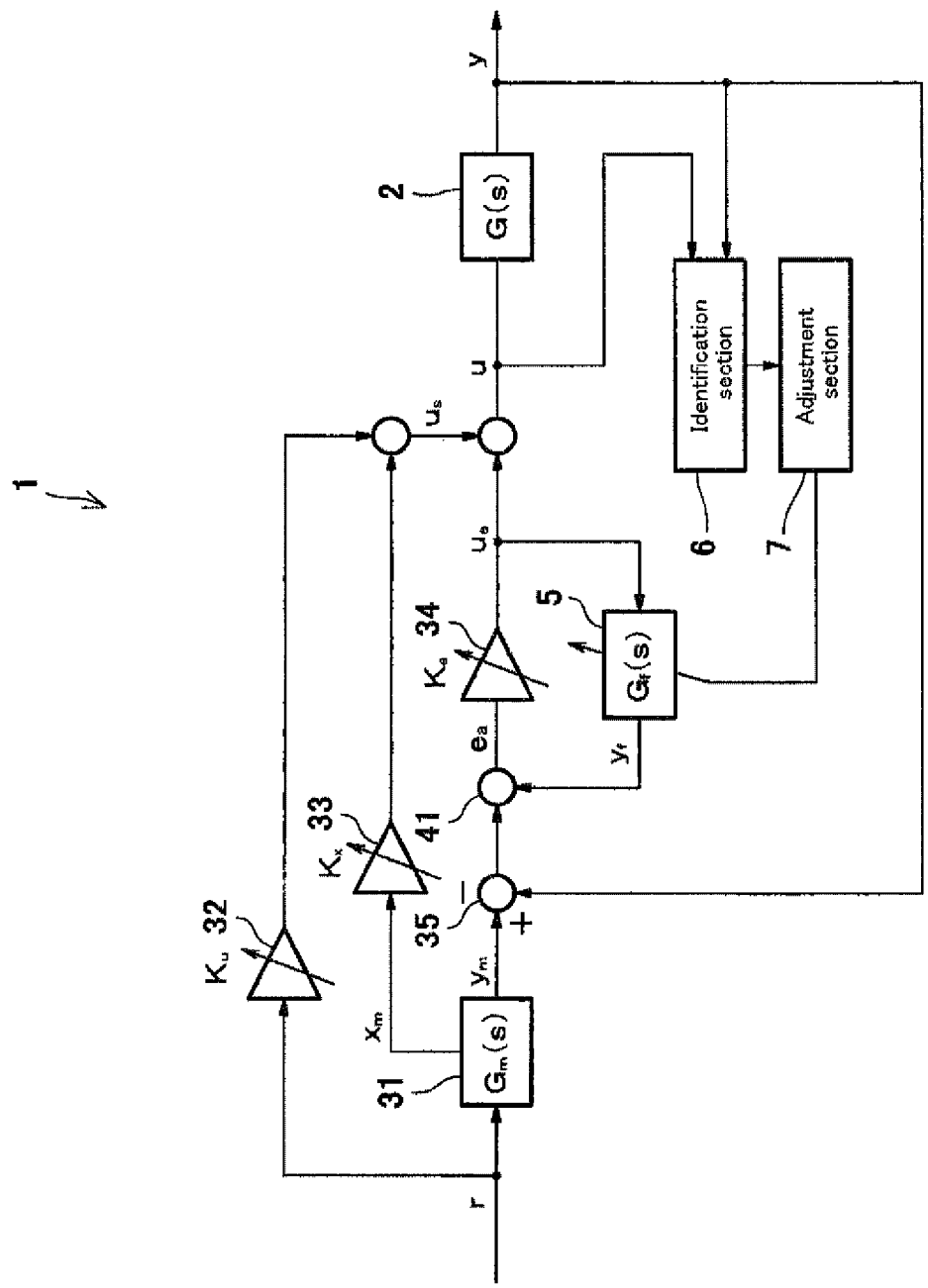
FIG. 6 is an equivalent block diagram showing a configuration which is equivalent to that of the adaptive control device of FIG. 5.

FIG. 6 is an equivalent block diagram showing a configuration which is equivalent to that of the adaptive control device of FIG. 5. As shown in FIG. 6, the configuration of the adaptive control device 1 of FIG. 5 is equivalent to the configuration in which the PFC processor section 5 performs PFC computation based on the output $u_e$ of the third multiplier 34, and the adaptive control device 1 includes a fourth adder 41 which adds the output of the first subtracter 35 and the output $y_f$ of the PFC processor section 5, in place of the third adder 39. Therefore, in the case of the dynamic compensation, the compensation value $y_f$ of the PFC is calculated as follows.

$$y_f^d(k+1) = a_f y_f^d(k) + b_f \mu_e(k)$$

$$y_f(k) = y_f^d(k) + d_f \mu_e(k) \quad (21)$$

Hereinafter, SAC operation will be described with reference to the equivalent block diagram of FIG. 6.

The input (operation value) u to the controlled target is expressed as follows:

$$u_e(k) = K_e e_a(k)$$

$$u_s(k) = K_x x_m(k) + K_u r(k)$$

$$u(k) = u_e(k) + u_s(k) \quad (22)$$

Adaptive gains $K_u$, $K_x$, $K_e$ shown in the above equation (22) are found by proportional and integral adaptive tuning rule as follows;

$$K_{Pe}(k) = -\gamma_{Pe} \frac{e_a^2(k)}{N^2(k)} \quad (23)$$

$$K_{Ie}(k) = (1 - \sigma_e(k))K_{Ie}(k-1) - \gamma_{Ie} \frac{e_a^2(k)}{N^2(k)}$$

$$K_e(k) = K_{Pe}(k) + K_{Ie}(k)$$

$$K_{Px}^i(k) = -\gamma_{Px}^i \frac{x_m^i(k)e_a(k)}{N^2(k)}$$

$$K_{ix}^i(k) = (1 - \sigma_x^i(k))K_{ix}^i(k-1) - \gamma_{ix}^i \frac{x_m^i(k)e_a(k)}{N^2(k)}$$

$$K_x^i(k) = K_{Px}^i(k) + K_{ix}^i(k)$$

$$K_{Pu}(k) = -\gamma_{Pu} \frac{r(k)e_a(k)}{N^2(k)}$$

$$K_{iu}(k) = (1 - \sigma_u(k))K_{iu}(k-1) - \gamma_{iu} \frac{r(k)e_a(k)}{N^2(k)}$$

$$K_u(k) = K_{Pu}(k) + K_{iu}(k)$$

$\gamma_{pe}$, $\gamma_{Ie}$, $\gamma_{px}$, $\gamma_{Ix}$, $\gamma_{pu}$, $\gamma_{Iu}$ indicate tuning rule gains, respectively. Superscript i in each of $K_x$, $\gamma_{px}$, $\gamma_{Ix}$, indicates a gain corresponding to an i-th state amount $x_m^i$ of the reference model.

N(k) in the above equation (23) is a normalized signal, and is given by the following equation:

$$N(k) = \sqrt{m^2 + m_u r^2(k) + m_{ym} y_m^2(k)} \quad (24)$$

m, $m_u$, $m_{ym}$ indicate normalized parameters, respectively. $\sigma_e$, $\sigma_x$, $\sigma_u$ in the above equation (23) are σ modification gains for preventing a variance of the adaptive gains, and are variable according to a control deviation, a command value, a reference output, and a reference model state amount as follows:

$$\sigma_e(k) = \beta_{e1} + \frac{\beta_{e3} e_a^2(k-1)/N^2(k-1)}{\beta_{e2} + e_a^2(k-1)/N^2(k-1)} \quad (25)$$

$$\sigma_x^i(k) = \beta_{x1}^i + \frac{\beta_{x3}^i e_a^2(k-1)/N^2(k-1)}{\beta_{x2}^i + e_a^2(k-1)/N^2(k-1)} \ldots |x_m^i(k)| > C_{x0}^i \quad (26)$$

and $$|r(k) - y_m(k)| > C_{em0}$$

$$\sigma_x^i(k) = \beta_{x1}^i \ldots \text{except for above}$$

$$\sigma_u(k) = \beta_{u1} + \frac{\beta_{u3} e_a^2(k-1)/N^2(k-1)}{\beta_{u2} + e_u^2(k-1)/N^2(k-1)} \ldots |r(k)| > C_{u0} \quad (27)$$

and $$|r(k) - y_m(k)| > C_{em0}$$

$$\sigma_u(k) = \beta_{u1} \ldots \text{except for above}$$

$\beta e_1$ to $\beta ie_3$, $\beta_{x1}$ to $\beta_{x3}$, $\beta_{u1}$ to $\beta_{u3}$, $C_{x0}$, $C_{u0}$, $C_{em0}$ indicate design parameters. Each gain with superscript i indicates a gain corresponding to a i-th state amount $x_m^i$ of the reference model.

The output $e_a(k)$ of the fourth adder 41 which is used in calculation of the output $u_e(k)$ of the third multiplier 34 in the above equation (22) is, as shown in FIG. 6, expressed as $y(k) + y_f(k) - y_m(k)$. Therefore, the output $u_e(k)$ of the third multiplier 34 is expressed as follows using the equation (21):

$$u_e(k) = K_e e_a(k) = K_e(y(k) + y_f(k) - y_m(k)) = K_e(y(k) + y_f^d(k) - y_m(k) + d_f u_e(k)) \quad (28)$$

As can be clearly seen from the above equation (28), $u_e(k)$ is required for the calculation of the output $u_e(k)$ of the third multiplier 34. Calculation cannot be performed unless the above equation (22) is modified. Accordingly, of the output $e_a(k)$ of the fourth adder 41 an observable portion except for feedthrough term is $e_a^d(k)$, which results in an equation which is capable of calculation as follows:

$$e_a^d(k) = y(k) + y_f^d(k) - y_m(k) \quad (29)$$

$$u_e(k) = K_e(e_a^d(k) + d_f u_e(k))$$

$$= \frac{K_e}{1 - d_f K_e} e_a^d(k)$$

when $$K_a^d = \frac{K_e}{1 - d_f K_a},$$

$$u_e(k) = K_a^d e_a^d(k)$$

From the above, the control input (equation (22)) of the SAC unit is replaced as follows:

$$u_e(k) = K_e^d e_a^d(k)$$

$$u_s(k) = K_x x_m(k) + K_u r(k)$$

$$u(k) = u_e(k) + u_s(k) \quad (30)$$

In correspondence with the replacement of the feedback gain $K_e$ in the above equation (29), the adaptive tuning rule in the equation (23) is changed into an equation which is capable of calculation as follows:

$$K_e^d(k) = \frac{(1 - \sigma_e(k))\{K_e^d(k-1) - K_{Pe}^d(k-1)\} - (\gamma_{Pe} + \gamma_{ie})\frac{e_a^{d2}(k)}{N^2(k)}}{1 + d_f(\gamma_{Pe} + \gamma_{ie})\frac{e_a^{d2}(k)}{N^2(k)}} \quad (31)$$

$$K_e^d(k) = -\gamma_{Pe} \frac{e_a^2(k)}{N^2(k)}$$

$$e_a(k) = \{1 + d_f K_e^d(k)\} e_a^d(k)$$

$$K_{Px}^j(k) = -\gamma_{Px}^j \frac{x_m^j(k) e_a(k)}{N^2(k)}$$

$$K_{ix}^i(k) = (1 - \sigma_x^i(k))K_{ix}^i(k-1) - \gamma_{ix}^j \frac{x_m^j(k) e_a(k)}{N^2(k)}$$

$$K_x^i(k) = K_{Px}^i(k) + K_{ix}^i(k)$$

$$K_{Px}(k) = -\gamma_{Pu} \frac{r(k) e_a(k)}{N^2(k)}$$

$$K_{iu}(k) = (1 - \sigma_u(k))K_{tu}(k-1) - \gamma_{tu} \frac{r(k) e_a(k)}{N^2(k)}$$

$$K_u(k) = K_{Pu}(k) + K_{iu}(k)$$

Figure 7:
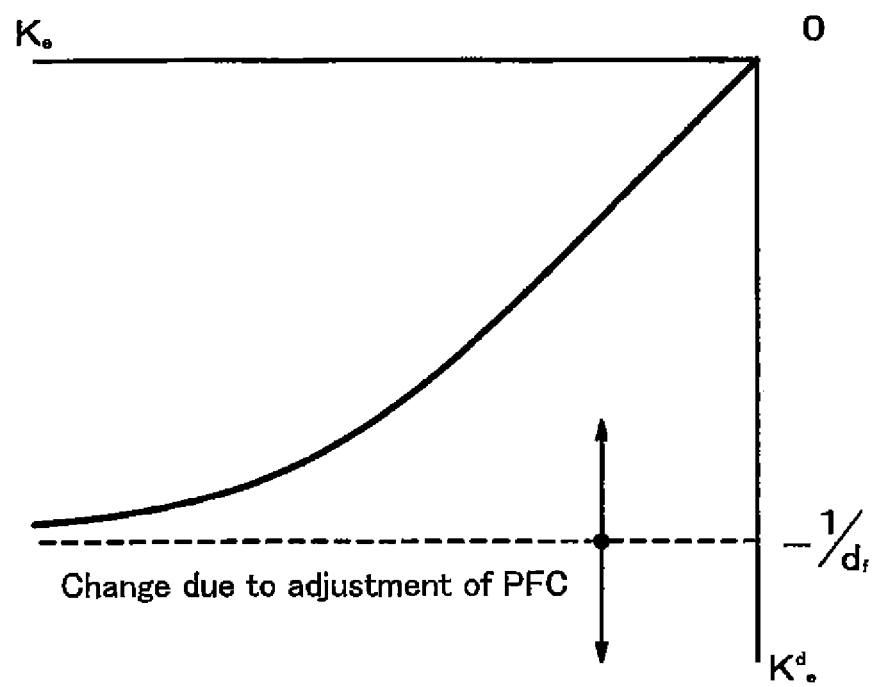
FIG. 7 is a graph showing a relationship between an adaptive feedback gain $K_e$ and an adaptive feedback gain $K^d_e$ obtained by excluding feedthrough term.

As described above, in the computer computation performed by the SAC unit of the controller 3 and the adjustment section 6 of the PFC 4, the adaptive feedback gain $K_e$ is replaced by $K^d_e$ in the equation (29). FIG. 7 is a graph showing a relationship between the adaptive feedback gain $K_e$ and the adaptive feedback gain $K^d_e$ obtained by excluding the feedthrough term. As shown in FIG. 7, a range of $K^d_e$ is $[-1/d_f, 0]$, with respect to a range $[-\infty, 0]$ of $K_e$. The feedthrough term $d_f$ may change depending on the adjustment section 7 of the PFC 4. However, depending on a value $d_f(k-1)$ before change and the corresponding value of $K^d_e$, $K^d_e$ may fall outside the range, after it has changed to $d_f(k)$. Accordingly, the adaptive gain $K^d_e$ is re-calculated according to a change in the feedthrough term $d_f$ as follows:

$$K^d_e \leftarrow \frac{K^d_e}{1 + \{d_f(k-1) - d_f(k)\}K^d_e} \quad (32)$$

It should be noted that a case where $K^d_e$ may fall outside the range according to a change in the transfer function $G_f(z)$ of the PFC 4 is limited to a case of $d_f(k) > d_f(k-1)$. Therefore, as shown below, adjustment of $K^d_e$ may not be performed in the case of $d_f(k) \leq d_f(k-1)$.

$$K^d_e \leftarrow \frac{K^d_e}{1 + \{d_f(k-1) - d_f(k)\}K^d_e} \quad \ldots d_f(k) > d_f(k-1) \quad (33)$$

$$K^d_e \leftarrow K^d_e \quad \ldots \text{except for above}$$

Alternatively, $K^d_e$ may be adjusted as follows. In this case, a response at a time point just after the feedthrough term $d_f$ has changed is sometimes better as compared to the case where re-calculation is performed using the equation (32) and the equation (33).

$$K^d_e \leftarrow \frac{d_f(k-1)}{d_f(k)} K^d_e \quad (34)$$

<How to Consider in Adjustment Method of PFC>

Figure 8:
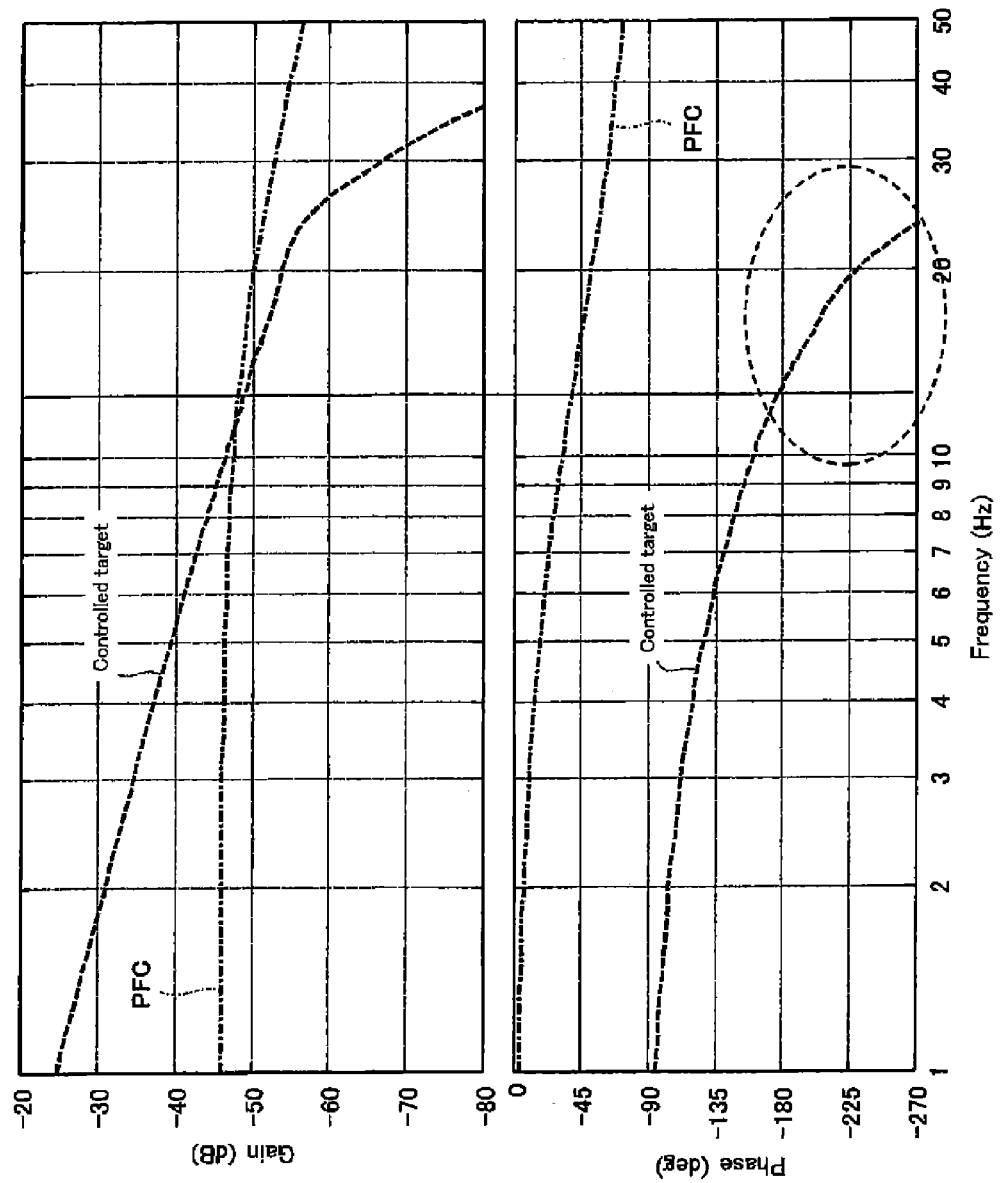
FIG. 8 is a graph showing a frequency response characteristic of a particular controlled target and a frequency response characteristic of a PFC designed according to the frequency response characteristic.

Now, how to consider in the above stated adjustment method of the PFC will be described. FIG. 8 is a graph showing a frequency response characteristic of a particular controlled target and a frequency response characteristic of a PFC designed according to the frequency response characteristic of the particular controlled target. FIG. 8 shows the frequency response characteristic of hydraulic equipment as the controlled target 2. As shown in FIG. 8, in the controlled target 2, a phase lag of about 180 degrees or more occurs in a range in which the frequency is equal to or higher than 13Hz. In feedback control, if there exists a frequency range in which the phase lag of about 180 degrees or more occurs, the control system may be more likely to become unstable when the feedback is performed with a gain of a specified magnitude or greater.

In light of this, it is designed that the output $y_f$ of the PFC 4 in which its phase lag is less than 90 degrees is greater than the output $y$ of the controlled target 2 in the frequency range in which the phase lag of the controlled target 2 is 180 degrees or more. Thereby, in the frequency range in which the phase lag of the controlled target 2 is 180 degrees or more, the output $y_f$ of the PFC 4 in which its phase lag is less than 90 degrees mainly occupies the output of the extended control system. Therefore, it appears that there is no response lag in the extended control system. In the example of FIG. 8, the frequency in a case where the phase lag of the controlled target 2 is a predetermined value (threshold) $\phi_p$ (180 degrees) is about 13 Hz ($\omega_p = 81.2$[rad/s]), and the corresponding gain of the controlled target 2 is about −49 dB ($K_p = 0.0035$). Therefore, it is designed that the PFC gain is $K_f = 0.005$, and the PFC frequency is $\omega_f = 100$[rad/s] in the case where the phase lag of the controlled target 2 is 180 degrees.

Figure 9:
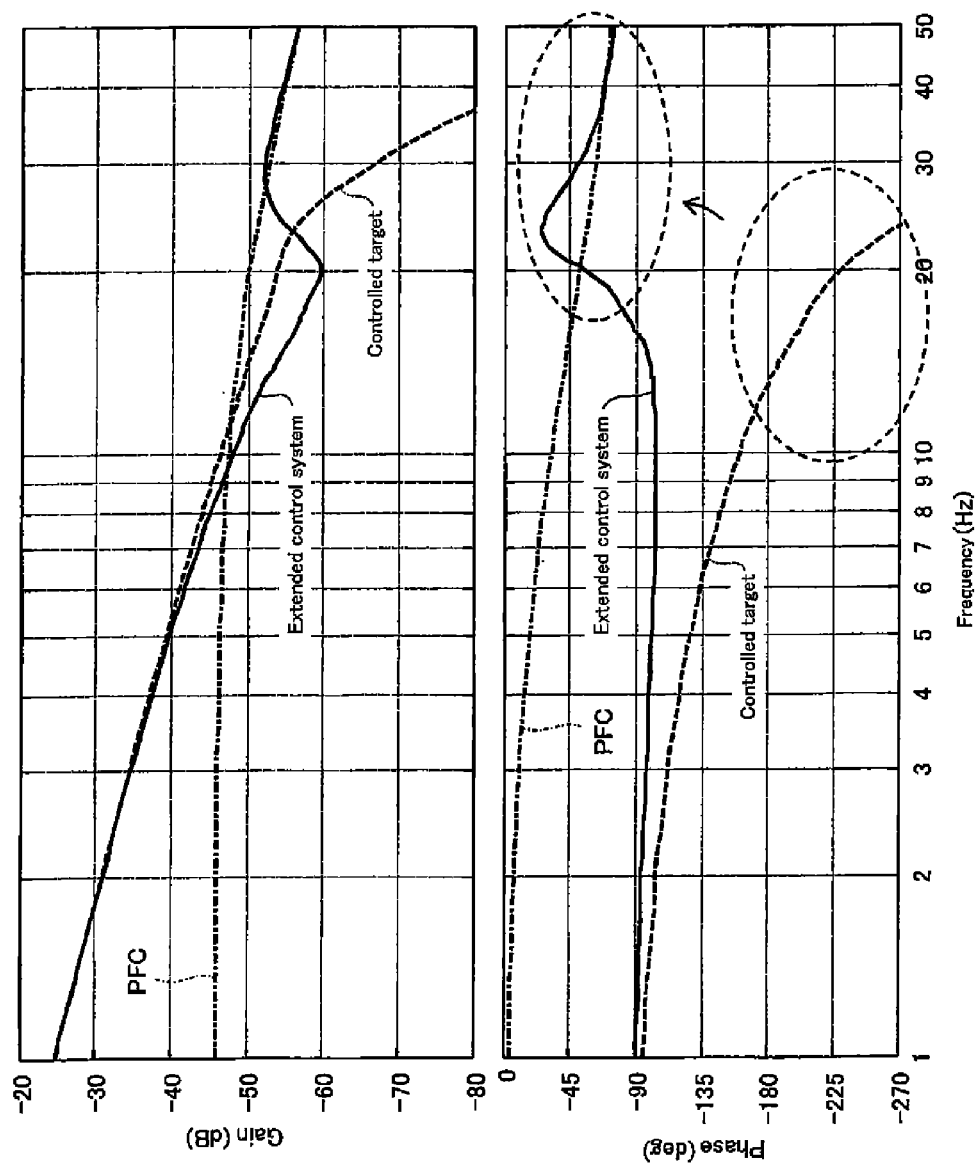
FIG. 9 is a graph showing a frequency response characteristic of an extended control system based on the frequency response characteristic of the controlled target and the frequency response characteristic of the PFC, which are shown in FIG. 8.

FIG. 9 is a graph showing the frequency response characteristic of the extended control system based on the frequency response characteristic of the controlled target and the frequency response characteristic of the PFC which are shown in FIG. 8. As shown in FIG. 9, the frequency response characteristic of the output (feedback value) $y_a$ of the extended control system, which is a sum of the output $y_f$ of the PFC 4 designed as described above and the output $y$ of the controlled target 2 is such that the phase lag is less than about 90 degrees in the frequency range in which the phase lag of the controlled target 2 itself is 180 degrees or more. In this way, the PFC gain $K_f$ and the PFC frequency $\omega_f$ can be suitably found from the frequency response characteristic of the controlled target 2. Although in the example of FIGS. 8 and 9, the threshold $\phi_p$ of the phase lag is set to 180 degrees, it may be set to 170 degrees or 150 degrees to provide a tolerance. As the threshold $\phi_p$ of the phase lag is set smaller, the extended control system is stabilized, but responsiveness degrades. Also, as the PFC gain $K_f$ and the PFC frequency $\omega_f$ are set greater with respect to the gain $K_p$ and the frequency $\omega_p$ of the controlled target 2 at the threshold $\phi_p$, respectively, the operation of the extended control system is stabilized, but responsiveness degrades.

The gain $K_p$ and the frequency $\omega_p$ of the controlled target 2, at the threshold $\phi_p$, are found using a numerical search method within the control cycle $T_s$. The gain $K_p$ and the frequency $\omega_p$ of the controlled target 2 are not required to have a high accuracy. Specifically, if the frequency coefficient $\alpha_w$ and the gain coefficient $\alpha_k$ which are the design parameters are set to relatively great values, then search can be ended assuming that a range of about ±5 to 10 degrees with respect to the threshold $\phi_p$ which is a search phase is an allowable error range. If efficient one-dimensional search method such as divine proportion search method is employed, the gain $K_p$ and the frequency $\omega_p$ of the controlled target 2 converge to fall into the allowable error ranges, by performing the search about five to ten times. Therefore, the numerical search method within the control cycle $T_s$ is allowed even when the control cycle $T_s$ is as short as about 0.002 to 0.005 second which is a general length.

Figure 10:
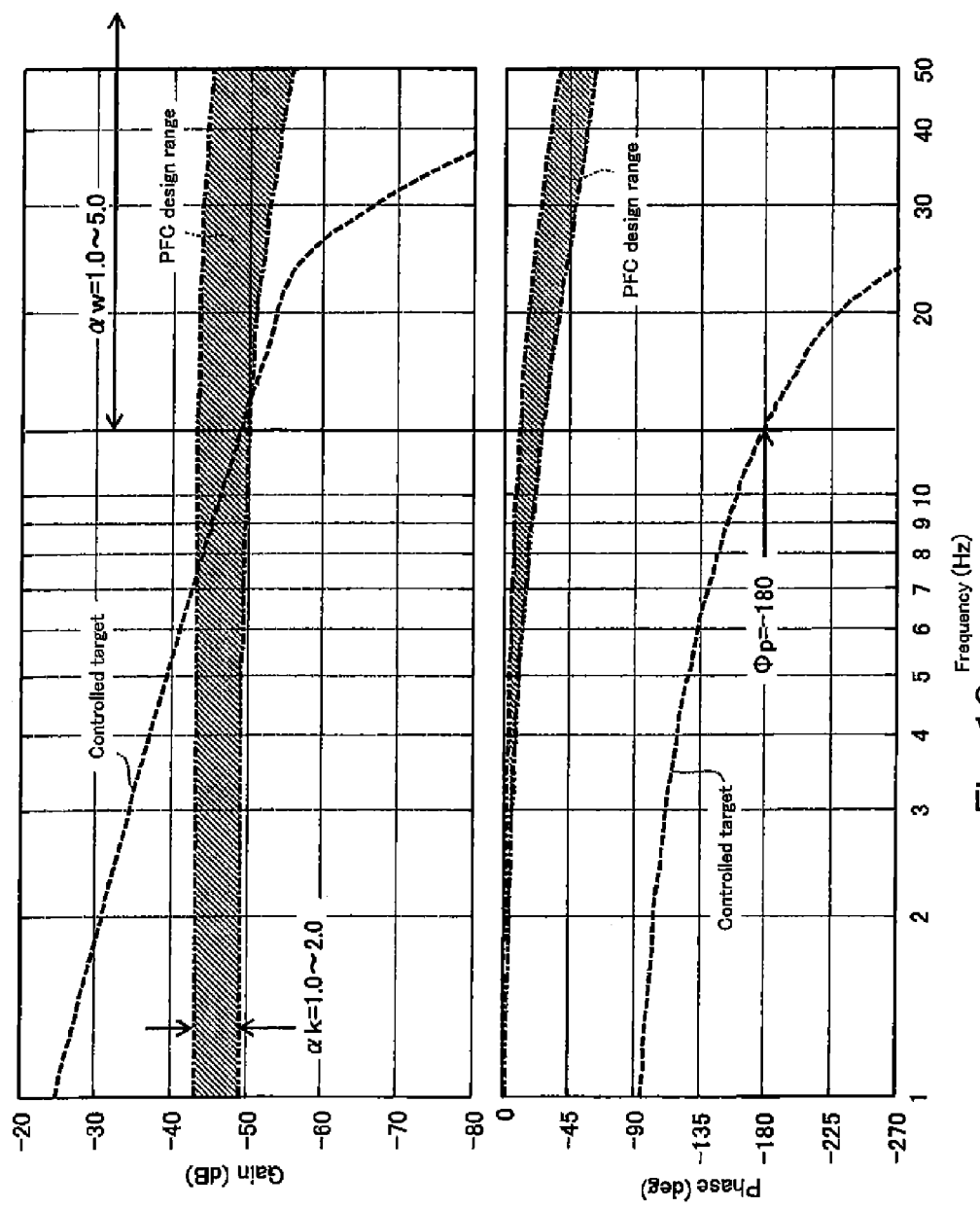
FIG. 10 is a graph showing a suitable design range of the PFC based on the frequency response characteristic of the controlled target of FIG. 8.

When the threshold $\phi_p$ of the phase lag of the transfer function $G(z)$ is, for example, 150 to 180 degrees, the frequency coefficient $\alpha_w$ which is the design parameter in the equation (15) is set to about 1.0 to 5.0, while the gain coefficient $\alpha_k$ which is the design parameter in the equation (15) is set to about 1.0 to 2.0. FIG. 10 is a graph showing a suitable design range of the PFC based on the frequency response characteristic of the controlled target of FIG. 8. By designing so that the output $y_f$ of the PFC falls within the design range of FIG. 10, optimal adaptive control can be performed while preventing a degradation of responsiveness.

<Application Example of the Present Embodiment>

Figure 11:
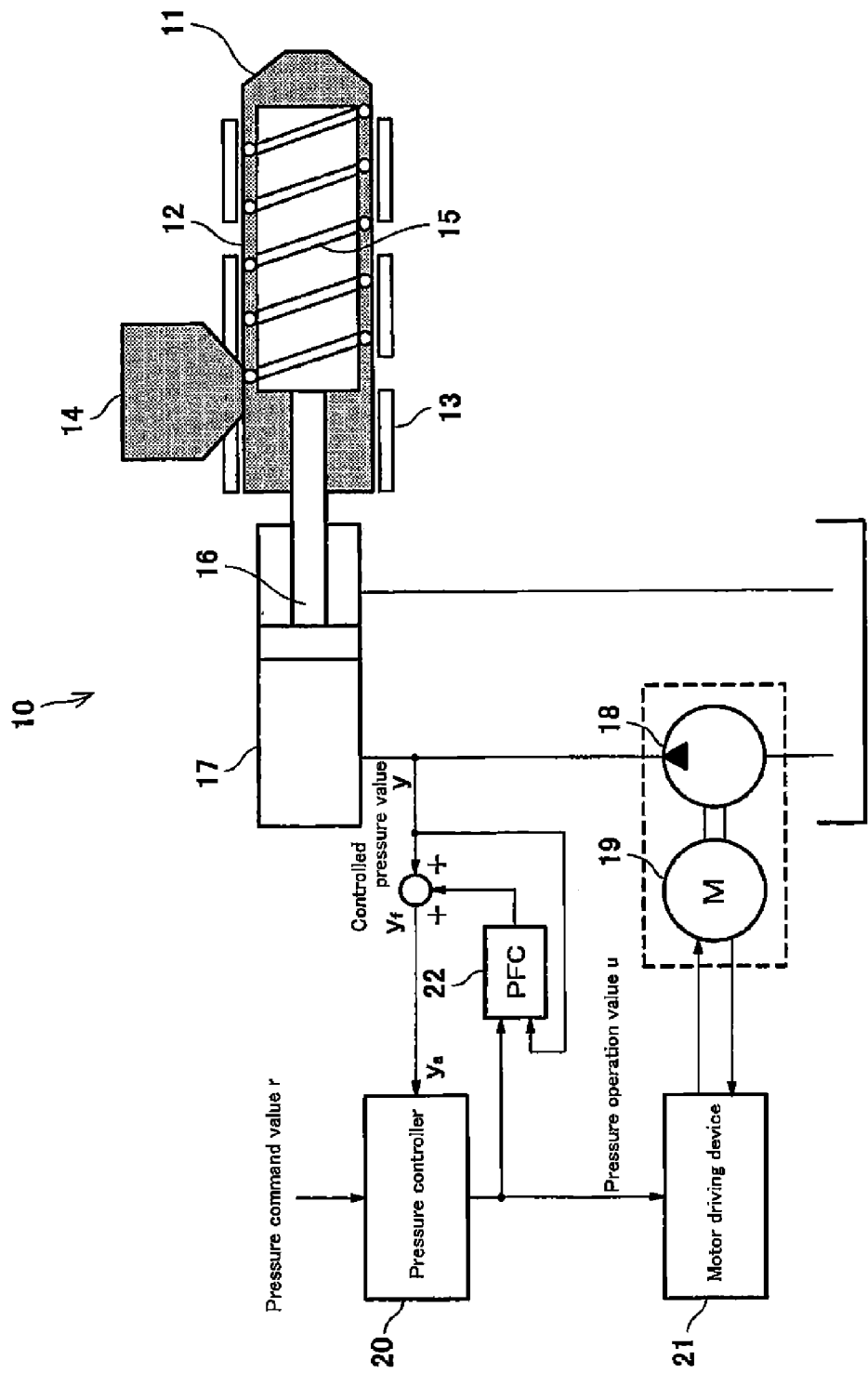
FIG. 11 is a schematic view showing an exemplary schematic configuration relating to pressure control of an injection molding machine to which the adaptive control device of FIG. 1 is applied.
Figure 12:
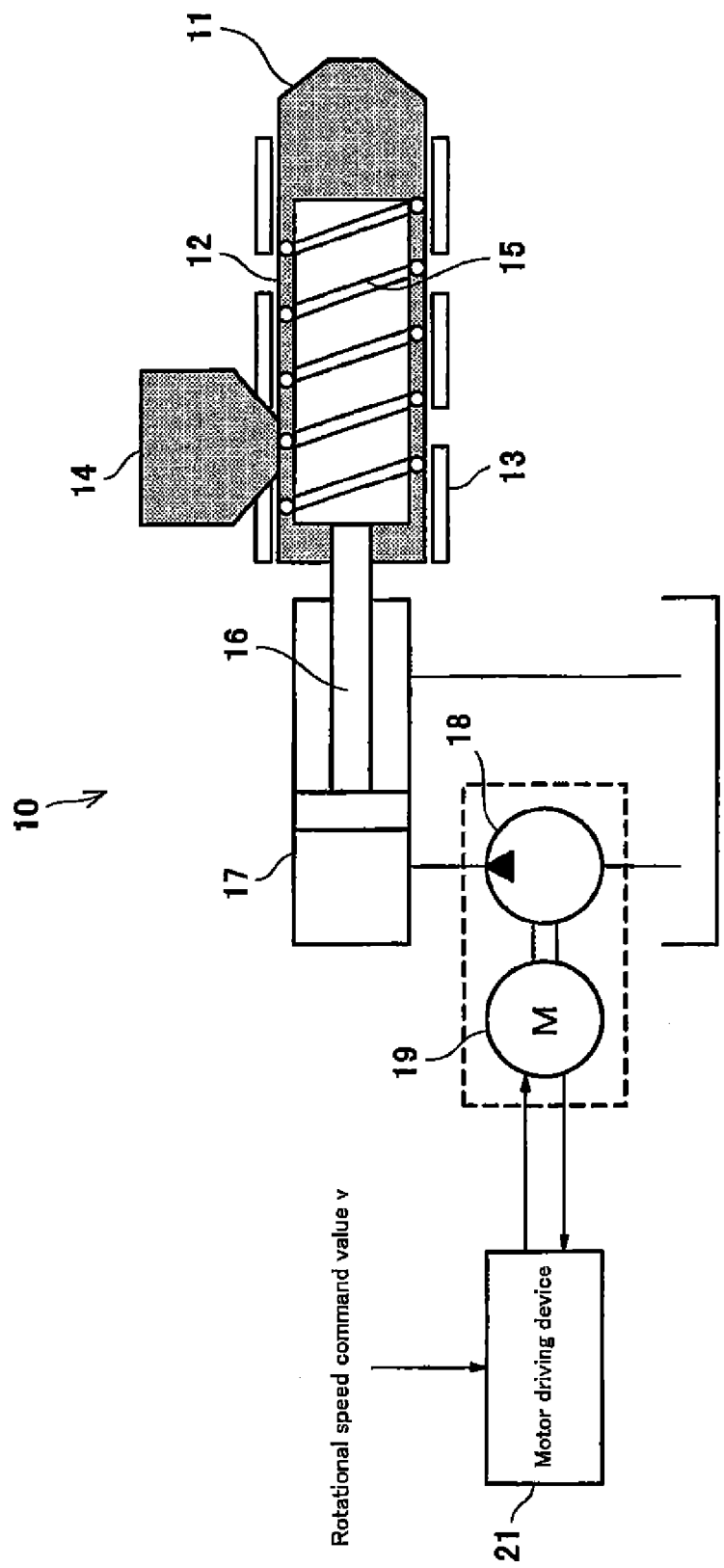
FIG. 12 is a schematic view showing an exemplary schematic configuration relating to flow control of the injection molding machine of FIG. 11.

Hereinafter, an example in which the adaptive control device 1 described in the above embodiment is applied to an injection molding machine will be described. FIG. 11 is a schematic view showing an exemplary schematic configuration relating to pressure control of the injection molding machine to which the adaptive control device of FIG. 1 is applied. FIG. 12 is a schematic view showing an exemplary schematic configuration relating to flow control of the injection molding machine of FIG. 11.

As shown in FIGS. 11 and 12, an injection molding machine 10 of the present application example includes an injection cylinder 12 which has a nozzle 11 for injecting a molding material (material to be molded) at a tip end thereof and carries an injection material (material to be injected) while melting it, a heater 13 for heating the molding material via the injection cylinder 12, a hopper 14 for throwing-in the molding material to an interior of the injection cylinder 12, a screw 15 which is axially movable while rotating around an axis of the injection cylinder 12 in the interior of the injection cylinder 12, a piston 16 for moving the screw 15, a hydraulic cylinder 17 which is inserted with the piston 16 and hydraulically moves the piston 16 (with an oil pressure), a hydraulic pump 18 for feeding hydraulic oil to the interior of the hydraulic cylinder 17, and a motor (servo motor) 19 which sets an oil amount of the hydraulic pump 18.

A control device of the injection molding machine 10 configured as described above includes a pressure controller 20 which outputs a pressure operation value u to a motor driving device 21 of the servo motor 19 which adjusts a pressure in the hydraulic cylinder 17 of the injection molding machine 10, and a PFC 22 which outputs based on the pressure operation value u, a pressure compensation value $y_f$ used for compensating a feedback value $y_a$ based on the pressure in the hydraulic cylinder 17. The pressure controller 20 detects the pressure in the hydraulic cylinder 17, hydraulic oil discharge pressure of the hydraulic pump 18, or the like, by a sensor (not shown), and inputs the detected pressure to the PFC 22. Thus, the pressure controller 20 performs the feedback control in such a manner that it outputs the pressure operation value u based on a pressure command value r and the feedback value $y_a$ which is a sum of the pressure in the hydraulic cylinder 17 and the pressure compensation value $y_f$ output from the PFC 22. The configuration of the PFC 22 is similar to that of the above embodiment. Pressure control shown in FIG. 11 is such that the pressure in the hydraulic cylinder 17 is controlled at a constant value in a pressure-keeping step, a clamping step, etc.

In accordance with the above configuration, the pressure compensation value $y_f$ output from the PFC 22 is automatically adjusted according to the frequency response characteristic of the injection molding machine 10 which is sequentially identified. Therefore, it is not necessary to manually re-adjust the pressure compensation value $y_f$ in response to a change in a size of the hydraulic cylinder 17 used in the injection molding machine 10, the injection material, etc. In addition, it is not necessary to increase the pressure compensation value $y_f$ unnecessarily, which can prevent a degradation of responsiveness. Besides, since the control parameters are adjusted based on the frequency response characteristic, a tolerance associated with modeling error is greater in the present configuration than in the conventional configuration which directly uses the identified parameters as the control parameters. In other words, the control parameters can be adjusted appropriately merely by detecting a trend of the frequency response characteristic even when the modeling error is greater. Therefore, in accordance with the above configuration, optimal adaptive control can be performed automatically and easily while preventing a degradation of responsiveness in the injection molding machine.

The control device of the injection molding machine 10 of the present application example may employ flow control in which a velocity of the hydraulic cylinder 17 is controlled to reach a constant value in the injection step, or the like. Specifically, the motor driving device 21 also serves as a flow controller for controlling a flow (rate) of the hydraulic oil inflowing to the interior of the hydraulic cylinder 17. The flow of the hydraulic oil inflowing to the hydraulic cylinder 17 is detected by detecting a rotational speed of the servo motor 19.

In the present application example, the injection molding machine 10 is drivably controlled by switching between the above stated flow control and the above stated pressure control according to cases.

More specifically, the control device of the injection molding machine 10 is configured to detect, after starting the flow control using the motor driving device 21 which is the flow controller, at least one of the pressure in the hydraulic cylinder 17, a stroke of the piston 16 sliding within the hydraulic cylinder 17, and time that passes from when the flow control using the flow controller has started, and to start the pressure control using the pressure controller, in place of the flow control, when the detected value exceeds a corresponding preset predetermined threshold. In the same manner, the control devicedetermines whether or not to switch from the pressure control to the flow control based on a threshold. The threshold used to determine whether or not to switch from the pressure control to the flow control may be equal to or different from the threshold used to determine whether or not to switch from the flow control to the pressure control. This makes it possible to switch between the flow control and the pressure control according to the state of the injection molding machine 10. Therefore, proper control can be implemented.

In addition, between the flow control step and the pressure control step, a characteristic (control structure) of a controlled target (servo motor 19) changes significantly. For this reason, there is a possibility that at a time point just after the flow control step has switched to the pressure control step, the identification section of the PFC 22 cannot estimate the frequency response characteristic correctly. In view of such a case, the adjustment section of the PFC 22 may be configured to select either one of the frequency response characteristic of the injection molding machine which is sequentially estimated by the identification section of the PFC 22, and a predetermined frequency response characteristic of the injection molding machine or the frequency response characteristic of the injection molding machine which is estimated at past time by the identification section, and to adjust the pressure compensation value based on the selected frequency response characteristic.

In accordance with this configuration, in a case where it is difficult to correctly estimate the frequency response characteristic by the sequential identification, for example, at a time point just after the pressure controller 20 has started the control of the injection molding machine 10, the pressure compensation value is adjusted using the predetermined frequency response characteristic or the frequency response characteristic estimated at past time by the identification section, thereby preventing a situation in which the adaptive control becomes unstable, while in other cases, the injection molding machine 10 is controlled using the frequency response characteristic identified sequentially. In this way, optimal adaptive control can be performed while preventing a degradation of responsiveness.

For switching the frequency response characteristic to be selected between either one of the frequency response characteristic sequentially identified, and the predetermined frequency response characteristic or the frequency response characteristic estimated at past time by the identification section, at least one of the pressure in the hydraulic cylinder 17, the stroke of the piston 16 sliding within the hydraulic cylinder 17, and the time that passes from when the flow control using the flow controller has started, may be detected, and the frequency response characteristic to be selected may be switched when the detected value exceeds the corresponding preset predetermined threshold.

Figure 13:
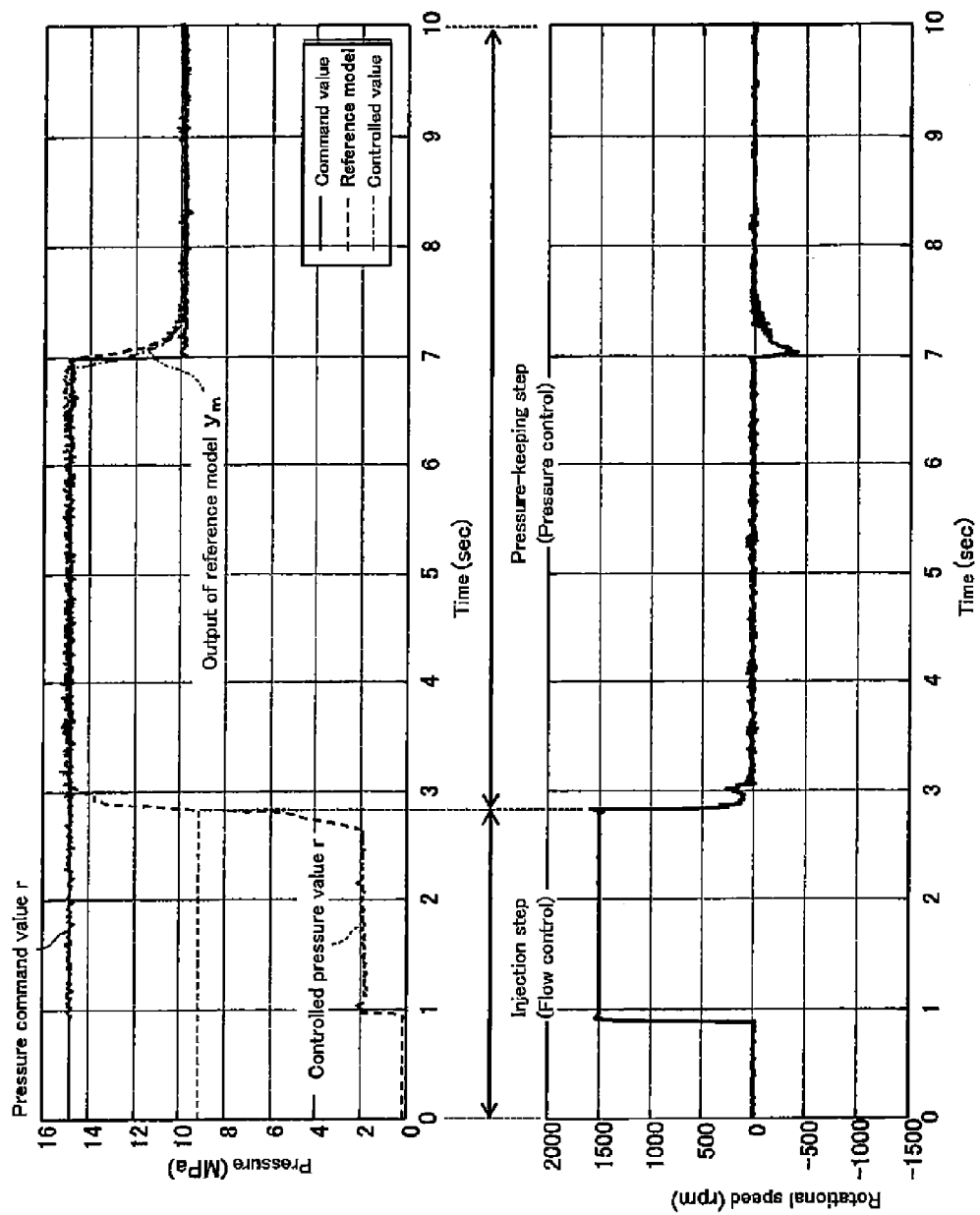
FIG. 13 is a graph showing outputs in a case where a simulation of switching between an injection step and a pressure-keeping step is performed in the injection molding machine of FIGS. 11 and 12.

FIG. 13 is a graph showing outputs in a case where a simulation of switching between the injection step and the pressure-keeping step is performed in the injection molding machine of FIGS. 11 and 12. In the example of FIG. 13, switching from the flow control to the pressure control is performed when the hydraulic pressure in the hydraulic cylinder 17 has reached a predetermined threshold (about 9 MPa). With reference to FIG. 13, the flow control is performed in the injection step, and the injection step shifts to the pressure-keeping step which is the pressure control, when the hydraulic pressure in the hydraulic cylinder 17 exceeds the predetermined threshold. In the pressure-keeping step, the output $y_m$ of the reference model is generated based on the pressure command value r. It can be confirmed that the controlled pressure value y well tracks the output $y_m$ of the reference model, and thus a good responsiveness is attained.

(Modified Example)

Thus far, the embodiment of the present invention has been described. The present invention is not limited to the above embodiment and can be improved, changed or modified in various ways without departing from a spirit of the invention.

For example, although in the above described embodiment, the identification section 6 is configured to estimate the parameters of the linear black box model, using the Kalman filter, the present invention is not limited to this. For example, the parameters of the linear black box model may be estimated using recursive least squares (RLS). When a change in model parameters in RLS is considered, a forgetting coefficient (factor) for exponentially reducing a weight is set to past data, and the parameters are estimated as follows:

$$\varepsilon(k) = y_r(k) - \varphi^T(k)\theta(k-1) \quad (35)$$

$$\theta(k) = \theta(k-1) + \frac{P(k-1)\varphi(k)}{\lambda + \varphi^T(k)P(k-1)\varphi(k)}\varepsilon(k) \quad \theta(0) = \theta_0$$

$$P(k) = \frac{1}{\lambda}\left\{P(k-1) - \frac{P(k-1)\varphi(k)\varphi^T(k)P(k-1)}{\lambda + \varphi^T(k)P(k-1)\varphi(k)}\right\} \quad P(0) = \gamma I$$

θ(k) indicates a parameter vector of the model, φ(k) indicates a data vector at time k, and ε indicates a predicted error. γ indicates a positive constant and I indicates a unit matrix.

In a case where a physical structure of the controlled target 2 is obvious, the identification section 6 uses a physical model of the controlled target 2. This makes it possible to construct a more accurate adaptive control device. In this case, the identification section 6 may be configured to estimate unknown constants of the model, using the Kalman filter. This makes it possible to implement the adaptive control by the physical model by utilizing the known configuration. For example, in a case where the pressure control for the hydraulic cylinder is performed, a pressure change model of the hydraulic cylinder is given as follows:

$$\dot{p} = \kappa\frac{q - Ay}{Ax} \quad (36)$$

p indicates the cylinder pressure [Pa], q indicates a flow [m³/s] of the hydraulic oil discharged to the cylinder, A indicates a cylinder cross-sectional area [m²], x indicates a cylinder displacement amount [m], y indicates a cylinder velocity [m/s], and κ indicates a volumetric elastic coefficient. The flow q of the hydraulic oil discharged to the cylinder is an operation amount and the cylinder pressure p is a controlled amount. The cylinder cross-sectional area A is known, and the cylinder displacement amount x and the cylinder velocity y are measureable (known), while the volumetric elastic coefficient κ is unknown.

When the equation (36) is discretized, and expressed as a state equation considering a change in the volumetric elastic coefficient κ, the following is provided:

$$\begin{bmatrix} p(k+1) \\ \kappa(k+1) \end{bmatrix} = \begin{bmatrix} 1 & \frac{q(k) - Ay(k)}{Ax(k)}T_s \\ 0 & 0 \end{bmatrix}\begin{bmatrix} p(k) \\ \kappa(k) \end{bmatrix} + \begin{bmatrix} 0 \\ w(k) \end{bmatrix} \quad (37)$$

$$p(k) = [1 \quad 0]\begin{bmatrix} p(k) \\ \kappa(k) \end{bmatrix} + v(k)$$

$$E\{w^2(k)\} = Q_0$$

$$E\{v^2(k)\} = R$$

$Q_0$ indicates a variance (changing magnitude) of the volumetric elastic coefficient, and R indicates a variance of observation noise. $T_s$ indicates a control cycle [sec]. Note that the variance $Q_0$ of the volumetric elastic coefficient is 0 in a steady state (state in which no change occurs in input/output).

With reference to the above equation (37) and by using the Kalman filter, the volumetric elastic coefficient κ which is the unknown constant of the physical model is estimated. Prior to describing an estimation procedure, the following symbols are defined:

$$\theta(k) = \begin{bmatrix} p(k) \\ \kappa(k) \end{bmatrix} \quad (38)$$

$$F(k) = \begin{bmatrix} 1 & \frac{q(k) - Ay(k)}{Ax(k)}T_s \\ 0 & 0 \end{bmatrix}$$

$$H(k) = [1 \quad 0]$$

$$Q = \begin{bmatrix} 0 & 0 \\ 0 & Q_0 \end{bmatrix}$$

Hereinafter, the estimation procedure using the Kalman filter will be specifically described. Initially, using an initial value $\theta_i(k)$ of the estimated parameter value and an initial value $P_i(k)$ of the error covariance matrix, the identification section 6 calculates the predicted error $\varepsilon_i(k)$ and the Kalman gain W(k) as follows:

$$\varepsilon_i(k) = p(k) - H(k)\theta_i(k) \quad (39)$$

$$W(k) = \frac{P_i(k)H^T(k)}{H(k)P_i(k)H^T(k) + R} \quad (40)$$

According to the above equation (39) and the above equation (40), the estimated parameter value θ(k) and the error covariance matrix P(k) are modified as follows:

$$\theta(k) = \theta_i(k) + W(k)\epsilon_i(k) \quad (41)$$

$$P(k) = P_i(k) - W(k)H(k)P_i(k) \quad (42)$$

Furthermore, time step is updated, and then an initial value θ$_i$(k+1) of the estimated parameter value and an initial value P$_i$(k+1) of the error covariance matrix, in next step, are calculated:

$$\theta_i(k+1) = F(k)\theta(k) \quad (43)$$

$$P_i(k+1) = F(k)P(k)F^T(k) + Q \quad (44)$$

In the steady state, the variance Q of the parameters is 0, and therefore, the initial value P$_i$(k+1) of the error covariance matrix in next step is only P(k).

By sequentially estimating the parameter value θ as described above, the volumetric elastic coefficient κ is estimated.

A transfer function G(z) from the flow q(k) of the hydraulic oil inflowing to the hydraulic cylinder to the pressure p(k) of the hydraulic cylinder is expressed as follows:

$$G(z) = \frac{p(k)}{q(k)} = \frac{\kappa(k)}{Ax(k)} \frac{T_s}{z-1} \quad (45)$$

The above equation (45) can be expressed by the measureable cylinder displacement amount x(k), the known cylinder cross-sectional area A, and the volumetric elastic coefficient κ estimated by the identification section 6. As described above, in a case where the physical structure of the controlled target 2 is obvious, the frequency response characteristic of the controlled target 2 can be estimated more accurately by utilizing the known configuration.

Alternatively, the controlled target 2 can be identified without using the linear black box model. For example, IIR filter representing the controlled target 2 may be found using an adaptive digital filter such as a hyperstable adaptive recursive filter (HARF) or a simplified HARF (SHARP). It is sufficient that the frequency response characteristic of the controlled target 2 can be estimated finally in the present invention. Therefore, the model of the controlled target 2 is not necessarily identified. In other words, the identification section 6 may directly estimate the frequency response characteristic. As a method of directly estimating the frequency response characteristic, for example, there are Short-time Fourier Transform, Continuous Wavelet Transform, etc.

Figure 14:
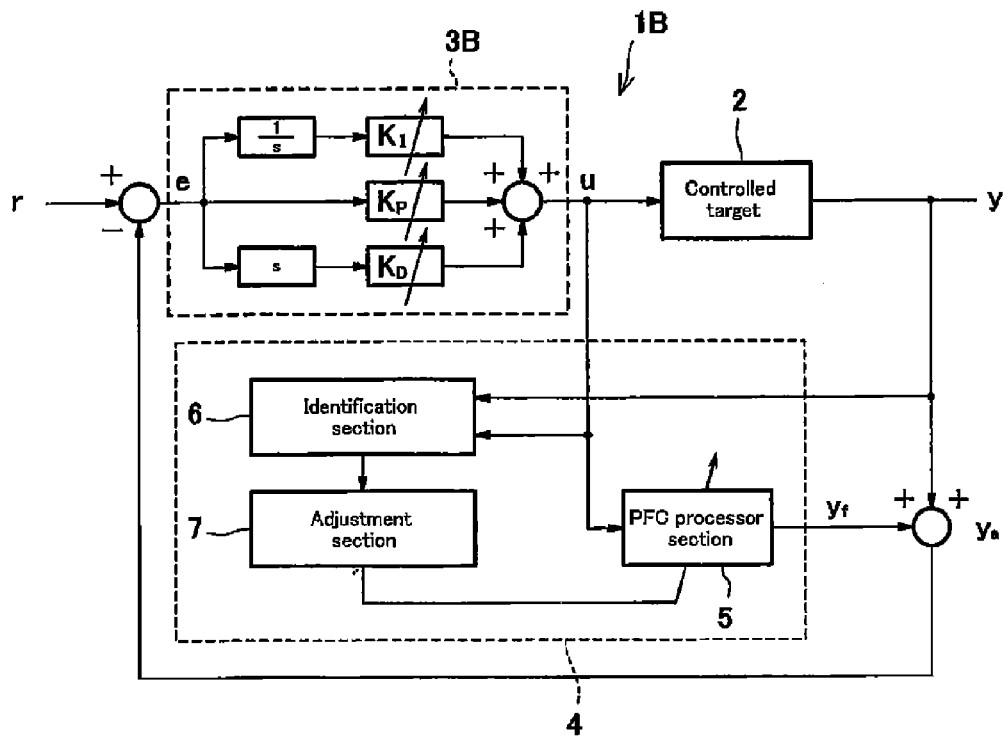
FIG. 14 is a block diagram showing an exemplary schematic configuration of an adaptive control device according to another embodiment of the present invention.

Although in the above described embodiment, the controller 3 to which the PFC 4 is applied includes the SAC unit, the controller 3 is not limited to this. For example, the controller may be an adaptive PID control section. FIG. 14 is a block diagram showing an exemplary schematic configuration of an adaptive control device according to another embodiment of the present invention. In an adaptive control device 1B of the example of FIG. 14, an adaptive proportional gain K$_P$, an adaptive derivative gain K$_D$, and an adaptive integral gain K$_I$ of the adaptive PID controller 3B are adjusted based on the error e between the command value r, and the output y$_a$ of the extended control system, which is a sum of the output y$_f$ of the PFC 4 (PFC processor section 5) and the output (controlled value) y of the controlled target 2, integral value w and derivative value d of the error e. Detailed description of application of the PFC 40 which does not include the identification section 6 and the adjustment section 7 to the adaptive PID control is known, and will not be given here (see e.g., International Publication No. 2008/018496, or "simple adaptive control SAC" 2008, written by Iwai Zenta, et al., (published by Morikita) etc.).

Figure 15:
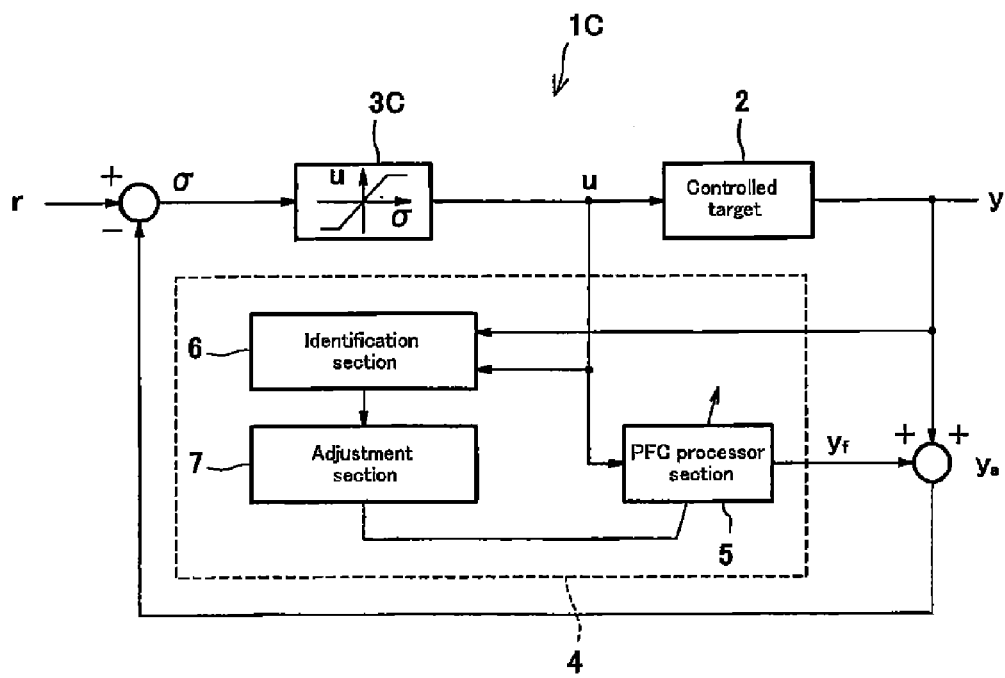
FIG. 15 is a block diagram showing an exemplary schematic configuration of an adaptive control device according to another embodiment of the present invention.

In a further alternative, the controller may be a sliding mode control section. FIG. 15 is a block diagram showing an exemplary schematic configuration of an adaptive control device according to another embodiment of the present invention. In an adaptive control device 1C of the example of FIG. 15, a sliding mode controller 3C calculates a non-linear switching input (operation value) u using as a switching function σ, the error between the command value r and the output (controlled value) y$_a$ of the extended control system. In normal sliding mode control, a switching hyperplane is constructed using a state variable of a controlled target. However, as in the present example, the use of the PFC 4 allows the switching hyperplane to be constructed only using the output of the controlled target 2. Since the section for estimating the state variable, for example, observer, is not necessary, a control system (sliding mode control system) can be constructed relatively easily. Detailed description of application of the PFC 40 which does not include the identification section 6 and the adjustment section 7 to the sliding mode control system is known, and will not be given here (see e.g., "simple adaptive control SAC" 2008, written by Iwai Zenta, et al., (published by Morikita) etc.).

EXAMPLES

Regarding each of an adaptive control device according to Example of the present invention and a SAC unit (Comparative example) in which a transfer function of a PFC is fixed, a tracking capability of the output y of the controlled target with respect to the output y$_m$ of the reference model was simulated using a model in which the transfer function of the controlled target changes. Among the parameters of the SAC in Example and Comparative example, parameters (control cycle T$_s$, parameters a$_m$, b$_m$, c$_m$, d$_m$ of reference model, tuning rule gains γ$_{pe}$, γ$_{px}$, γ$_{pu}$, σ modification gains β$_{e1}$ to β$_{e3}$, β$_{x1}$ to β$_{x3}$, β$_{u1}$ to β$_{u3}$, etc.) of the SAC were equal values in Example and Comparative example except that a gain (0.005) of an output of the PFC and a frequency (30 Hz) in Comparative example were fixed values. In the present Example, the threshold φ$_p$ of the phase lag was 180 degrees, the frequency coefficient α$_k$ was 1.5, and the gain coefficient α$_k$ was 1.

As the model of the controlled target, used was a model in which the transfer function G(s) changed with time as follows:

$$G(s) = \begin{cases} \dfrac{1.5}{5s+1} e^{-0.025s} & (0 \le t < 4,\ 12 \le t < 20) \\ \dfrac{0.15}{5s+1} e^{-0.025s} & (4 \le t < 12) \end{cases} \quad (46)$$

In the above equation (46), the model is such that the gain changes 10 times every time the transfer function G(s) changes with time. For every gain, it is necessary to design a stable PFC. In view of this, in the present Comparative example, it is designed that the compensation value of the PFC is optimal in a range in which the gain of the controlled target is great (transfer function G(s) in a range of 0≤t<4, 12≤t<20 is 1.5 e$^{-0.025s}$/(5s+1)).

Figure 16:
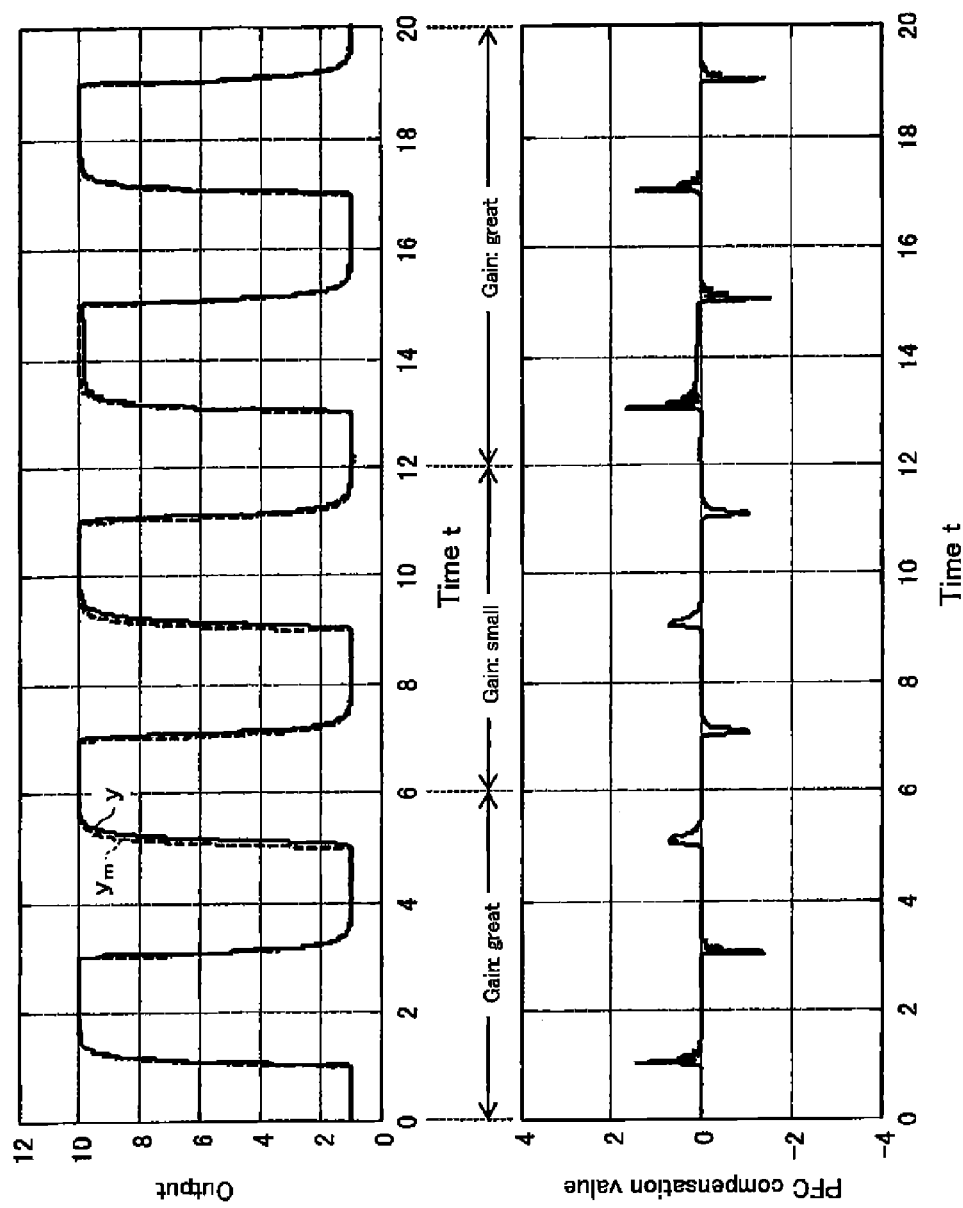
FIG. 16 is a graph showing a result of a simulation of an adaptive control device according to Example of the present invention.
Figure 17:
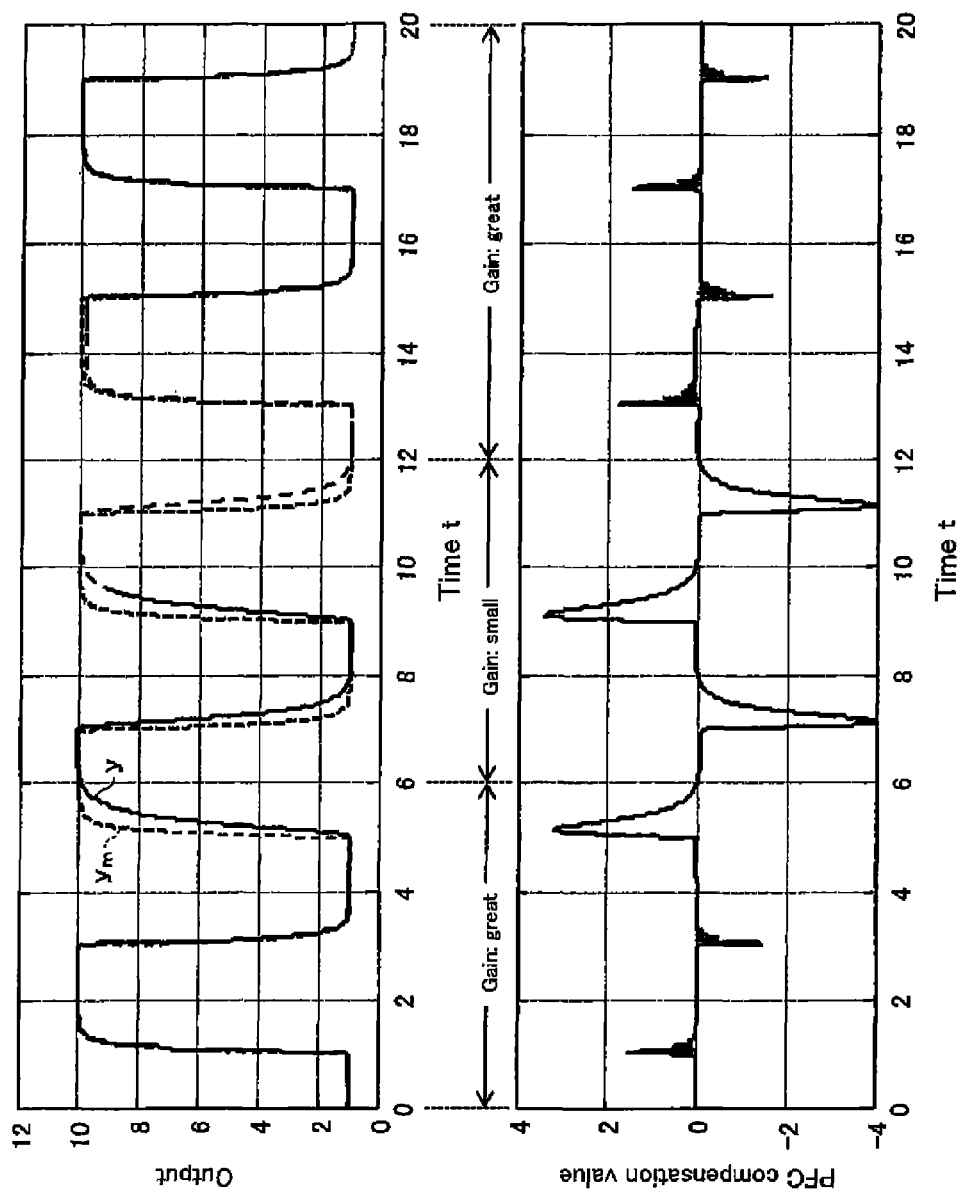
FIG. 17 is a graph showing a result of a simulation of a SAC unit in Comparative example.

FIG. 16 is a graph showing a result of a simulation of the adaptive control device according to Example of the present invention. FIG. 17 is a graph showing a result of a simulation of the SAC unit in Comparative example. As can be seen from FIGS. 16 and 17, in a range in which the gain of the controlled target is great (transfer function G(s) in a range of 0≤t<4, 12≤t<20 is 1.5 $e^{-0.025s}/(5s+1)$), the output (controlled value) y of the controlled target well tracks the output (reference output) $y_m$ of the reference model in both of Example and Comparative example.

However, in a range in which the gain of the controlled target is small (transfer function G(s) in a range of 4≤t<12 is 0.15 $e^{-0.025s}/(5s+1)$), the compensation value of the PFC in Comparative example (FIG. 17) is very large. It can be estimated that this is due to the fact that the PFC in Comparative example performs excessive compensation, which is about 10 times, in the range in which the gain is small. Because of this, in Comparative example, as shown in FIG. 17, the output y of the controlled target cannot well track the output $y_m$ of the reference model in the range in which the gain is small.

In contrast, it can be understood that in the present Example (FIG. 16), even in the range in which the gain of the controlled target is small, the compensation value of the PFC is not excessively increased, and the output y of the controlled target well tracks the output $y_m$ of the reference model in this range. Thus, in accordance with the adaptive control device of the present Example, it was proved that even when the transfer function (gain) of the controlled target changes, the compensation value of the PFC is modified properly, and therefore the output y of the controlled target is allowed to stably track the output $y_m$ of the reference model, irrespective of a change in the controlled target.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

An adaptive control device and adaptive control method, and a control device of an injection molding machine of the present invention are effectively employed to allow optimal adaptive control to be performed automatically and easily, while preventing a degradation of responsiveness.

REFERENCE SIGNS LIST 1, 1B, 1C adaptive control device
2 controlled target
3 controller
3B adaptive PID controller
3C sliding mode controller
4, 22 PFC
5 PFC processor section
6 identification section
7 adjustment section
10 injection molding machine
11 nozzle
12 injection cylinder
13 heater
14 hopper
15 screw
16 piston
17 hydraulic cylinder
18 hydraulic pump
19 servo motor (motor)
20 pressure controller
21 motor driving device
31 reference model application section
32 first multiplier
33 second multiplier
34 third multiplier
35 first subtracter
36 first adder
37 second adder
38 dynamic compensator
39 third adder
40 fourth adder

The invention claimed is:

1. An adaptive control device comprising:
a controller which outputs an operation value to a controlled target in response to a command value input to the controller; and
a parallel feed-forward compensator which outputs based on the operation value, a compensation value used for compensating a feedback value of a controlled value output from the controlled target;
the controller being configured to perform feedback control in such a manner that the controller outputs the operation value based on the command value and the feedback value which is a sum of the controlled value output from the controlled target and the compensation value output from the parallel feed-forward compensator;
wherein the parallel feed-forward compensator includes:
an identification section which sequentially estimates a frequency response characteristic of the controlled target; and
an adjustment section which adjusts the compensation value based on the estimated frequency response characteristic,
wherein the adjustment section is configured to adjust the compensation value by multiplying by predetermined coefficients, a frequency and a gain in which a phase lag of the controlled target is equal to or greater than a predetermined value based on the frequency response characteristic.

2. The adaptive control device according to claim 1,
wherein the identification section sequentially identifies a model of the controlled target, and estimates a transfer function of the controlled target; and
wherein the identification section sequentially estimates the frequency response characteristic of the controlled target based on the estimated transfer function.

3. The adaptive control device according to claim 2,
wherein the identification section uses a linear black box model.

4. The adaptive control device according to claim 3,
wherein the identification section estimates coefficients in polynomial representation of the linear black box model, using a Kalman filter.

5. The adaptive control device according to claim 2,
wherein the identification section uses a physical model of the controlled target.

6. The adaptive control device according to claim 5, wherein the identification section is configured to estimate unknown constants of the physical model of the controlled target, using a Kalman filter.

7. The adaptive control device according to claim 1, wherein the parallel feed-forward compensator has a transfer function in a first order lag system.

8. The adaptive control device according to claim 1, wherein the controller includes:
a simple adaptive control unit which adjusts a plurality of adaptive gains such that the controlled value output from the controlled target tracks a reference model designed to provide a predetermined response; and
wherein the plurality of adaptive gains include a first feed-forward gain corresponding to the command value, a second feed-forward gain corresponding to a state amount of the reference model, and a feedback gain corresponding to a deviation between an output of the reference model and the feedback value.

9. A control device of an injection molding machine which includes a pressure controller which outputs a pressure operation value to a motor for adjusting a pressure in a hydraulic cylinder of the injection molding machine, in response to a command value input to the pressure controller; and a parallel feed-forward compensator which outputs, based on the pressure operation value, a pressure compensation value used for compensating a feedback value based on the pressure in the hydraulic cylinder, the pressure controller being configured to perform feedback control in such a manner that the pressure controller outputs the pressure operation value based on the command value and the feedback value which is a sum of the pressure in the hydraulic cylinder and the pressure compensation value output from the parallel feed-forward compensator;
wherein the parallel feed-forward compensator includes:
an identification section which sequentially estimates a frequency response characteristic of the injection molding machine; and
an adjustment section which adjusts the pressure compensation value based on the estimated frequency response characteristic,
wherein the adjustment section is configured to adjust the pressure compensation value by multiplying by predetermined coefficients, a frequency and a gain in which a phase lag of the controlled target is equal to or greater than a predetermined value based on the frequency response characteristic.

10. The control device of the injection molding machine according to claim 9,
wherein the adjustment section is configured to select either one of the frequency response characteristic of the injection molding machine which is sequentially estimated by the identification section, and a predetermined frequency response characteristic of the injection molding machine or the frequency response characteristic of the injection molding machine which is estimated at past time by the identification section, and adjust the pressure compensation value based on the selected frequency response characteristic.

11. The control device of the injection molding machine according to claim 9, comprising:
a flow controller for controlling a flow of hydraulic oil inflowing to the hydraulic cylinder;
wherein the control device is configured to detect, after starting flow control using the flow controller, at least one of the pressure in the hydraulic cylinder, a stroke of a piston sliding within the hydraulic cylinder, and time that passes from when the flow control using the flow controller has started, and to start pressure control using the pressure controller, in place of the flow controller, when the detected value exceeds a corresponding preset predetermined threshold.

12. An adaptive control method performed for a control system which controls a controlled target by adding an output of a parallel feed-forward compensator to an output of the controlled target, comprising the steps of:
outputting an operation value to the controlled target in response to an input command value;
outputting from the parallel feed-forward compensator based on the operation value a compensation value used for compensating a feedback value of a controlled value output from the controlled target; and
performing feedback control in such a manner that the operation value is output to the controlled target based on the input command value and the feedback value which is a sum of the controlled value output from the controlled target and the compensation value:
wherein the step of outputting the compensation value includes the steps of:
sequentially estimating a frequency response characteristic of the controlled target; and
adjusting the compensation value based on the estimated frequency response characteristic,
wherein in the step of adjusting the compensation value, the compensation value is adjusted by multiplying by predetermined coefficients, a frequency and a gain in which a phase lag of the controlled target is equal to or greater than a predetermined value, based on the frequency response characteristic.

13. The adaptive control method according to claim 12, wherein in the step of sequentially estimating the frequency response characteristic, a model of the controlled target is sequentially identified, and a transfer function of the controlled target is estimated; and
wherein the frequency response characteristic of the controlled target is sequentially estimated based on the estimated transfer function.

14. The adaptive control method according to claim 13, wherein in the step of sequentially estimating the frequency response characteristic, a linear black box model is used.

15. The adaptive control method according to claim 14, wherein in the step of sequentially estimating the frequency response characteristic, coefficients in polynomial representation of the linear black box model are estimated, using a Kalman filter.

16. The adaptive control method according to claim 13, wherein in the step of sequentially estimating the frequency response characteristic, a physical model of the controlled target is used.

17. The adaptive control method according to claim 16, wherein in the step of sequentially estimating the frequency response characteristic, unknown constants of the physical model of the controlled target are estimated using a Kalman filter.

18. The adaptive control method according to claim 12, wherein the parallel feed-forward compensator has a transfer function in a first order lag system.

19. The adaptive control method according to claim 12, wherein the step of outputting the operation value includes the step of adjusting a plurality of adaptive gains such that the controlled value output from the controlled target tracks a reference model designed to provide a predetermined response; and the plurality of adaptive gains include a first feed-forward gain corresponding to the command value, a second feed-forward gain corresponding to a state amount of the reference model, and a feedback gain corresponding to a deviation between an output of the reference model and the feedback value.

20. A method of controlling an injection molding machine, which controls the injection molding machine by adding a pressure compensation value output from a parallel feed-forward compensator to a pressure in a hydraulic cylinder of the injection molding machine, the method comprising the steps of:

outputting a pressure operation value based on an input command value to a motor for adjusting the pressure in the hydraulic cylinder of the injection molding machine;

outputting from the parallel feed-forward compensator based on the pressure operation value, the pressure compensation value used for compensating a feedback value based on the pressure in the hydraulic cylinder; and performing feedback control in such a manner that the pressure operation value is output to the motor based on the input command value and the feedback value which is a sum of the pressure in the hydraulic cylinder and the pressure compensation value;

wherein the step of outputting the compensation value includes the steps of:

sequentially estimating a frequency response characteristic of the injection molding machine; and adjusting the pressure compensation value based on the estimated frequency response characteristic, wherein in the step of adjusting the pressure compensation value, the pressure compensation value is adjusted by multiplying by predetermined coefficients, a frequency and a gain in which a phase lag of the controlled target is equal to or greater than a predetermined value, based on the frequency response characteristic.

21. The control method of controlling the injection molding machine according to claim 20, wherein in the step of adjusting the pressure compensation value, either one of the frequency response characteristic of the injection molding machine which is sequentially estimated in the step of sequentially estimating the frequency response characteristic, and a predetermined frequency response characteristic of the injection molding machine or the frequency response characteristic of the injection molding machine which is estimated at past time in the step of sequentially estimating the frequency response characteristic, is selected, and the pressure compensation value is adjusted based on the selected frequency response characteristic.

22. The method of controlling the injection molding machine according to claim 20, comprising the step of:

controlling a flow of hydraulic oil inflowing to the hydraulic cylinder;

wherein a pressure control step including the step of outputting the operation value, the step of outputting the compensation value, and the step of performing the feedback control, is started in place of the step of controlling the flow of the hydraulic oil, when at least one of the pressure in the hydraulic cylinder, a stroke of a piston sliding within the hydraulic cylinder, and time that passes from when the step of controlling the flow of the hydraulic oil has started, exceeds a corresponding preset predetermined threshold, after the step of controlling the flow of the hydraulic oil has started.

* * * * *